(12) United States Patent
Lu et al.

(10) Patent No.: US 7,887,897 B2
(45) Date of Patent: Feb. 15, 2011

(54) CORDIERITE HONEYCOMB ARTICLE AND METHOD OF MANUFACTURE

(75) Inventors: Yanxia Lu, Painted Post, NY (US);
Jennifer Lynn Lyon, Corning, NY (US);
Jianguo Wang, Horseheads, NY (US);
John Forrest Wight, Jr., Corning, NY (US); Yuming Xie, Sugar Land, TX (US)

(73) Assignee: Corning Incorporated, Corning, NY (US)

( * ) Notice: Subject to any disclaimer, the term of this patent is extended or adjusted under 35 U.S.C. 154(b) by 98 days.

(21) Appl. No.: 12/229,829

(22) Filed: Aug. 27, 2008

(65) Prior Publication Data

US 2009/0087613 A1    Apr. 2, 2009

Related U.S. Application Data

(60) Provisional application No. 60/966,972, filed on Aug. 31, 2007.

(51) Int. Cl.
    *B32B 3/12*    (2006.01)
(52) U.S. Cl. .................................................. 428/116
(58) Field of Classification Search ........................ None
    See application file for complete search history.

(56) References Cited

U.S. PATENT DOCUMENTS

| | | | |
|---|---|---|---|
| 4,329,162 A | 5/1982 | Pitcher, Jr. | 55/523 |
| 4,390,355 A | 6/1983 | Hammond, Jr. et al. | 55/523 |
| 4,414,337 A | 11/1983 | Ichikawa et al. | 501/103 |
| 4,415,344 A | 11/1983 | Frost et al. | 55/523 |
| 4,416,676 A | 11/1983 | Montierth | 55/523 |

(Continued)

FOREIGN PATENT DOCUMENTS

DE    103 01 959    8/2003

(Continued)

OTHER PUBLICATIONS

Effect of talc grain size on microstructure of cordierite ceramics. Nakahara, Masae; Kondo, Yoshihito; Hamano, Kenya. Kagawa Industrial Technol. Cent., Takamatsu, Japan. Journal of the Ceramic Society of Japan (1995), 103(Oct.), 1051-6, Abstract.

(Continued)

*Primary Examiner*—Gordon R Baldwin
(74) *Attorney, Agent, or Firm*—Randall S. Wayland; Matthew B. McNutt; Matthew J. Mason

(57) ABSTRACT

Disclosed are ceramic honeycomb articles which are composed predominately of a crystalline phase cordierite composition. The porous cordierite ceramic honeycomb articles has a plurality of cell channels and intersecting porous walls and possess a microstructure characterized by a pore size distribution wherein greater than or equal to 75% of the pore size distribution of the porosity of the porous walls, by volume, have a pore diameter ($d_v$) wherein $d_v<10.0$ μm and less than or equal to 35% of the pore size distribution have $d_v \leq 4.0$ μm. Additionally, the pore diameter $d_{v90} \leq 14.0$ μm, and $CTE \leq 12.0 \times 10^{-7}/°C$. from 25° C. to 800° C. The articles exhibits high filtration efficiency coupled with low pressure drop across the filter. Additionally, high porosity articles having porosity greater than or equal to 40% and low surface roughness of $Ra<4.0$ μm are described. Additionally, a method for manufacturing the ceramic honeycomb articles wherein fine talc, fine silica-forming source and a fine pore former are disclose.

19 Claims, 7 Drawing Sheets

U.S. PATENT DOCUMENTS

| | | | | |
|---|---|---|---|---|
| 4,417,908 | A | 11/1983 | Pitcher, Jr. | 55/523 |
| 4,420,316 | A | 12/1983 | Frost et al. | 55/523 |
| 4,455,180 | A | 6/1984 | Hillman et al. | 156/89 |
| 4,509,966 | A | 4/1985 | Dimick et al. | 55/502 |
| 4,557,773 | A | 12/1985 | Bonzo | 156/64 |
| 4,573,896 | A | 3/1986 | Bonzo | 425/125 |
| 4,840,827 | A | 6/1989 | Mizutani et al. | 428/116 |
| 5,069,697 | A | 12/1991 | Hamaguchi et al. | 55/523 |
| 5,185,110 | A | 2/1993 | Hamaguchi et al. | 264/44 |
| 5,258,150 | A | 11/1993 | Merkel et al. | 264/43 |
| 5,262,102 | A | 11/1993 | Wada | 35/14 |
| 5,545,243 | A | 8/1996 | Kotani et al. | 55/523 |
| 5,762,895 | A | 6/1998 | Schwetz et al. | 423/345 |
| 6,080,348 | A | 6/2000 | Shakley | 264/177.12 |
| 6,087,281 | A | 7/2000 | Merkel | 501/9 |
| 6,413,895 | B1 | 7/2002 | Merkel | 501/134 |
| 6,541,407 | B2 | 4/2003 | Beall et al. | 501/119 |
| 6,673,414 | B2 | 1/2004 | Ketcham et al. | 428/116 |
| 6,696,132 | B2 | 2/2004 | Beall et al. | 428/116 |
| 6,773,481 | B2 | 8/2004 | Noguchi et al. | 55/523 |
| 6,800,108 | B2 | 10/2004 | Noda | 55/523 |
| 6,803,086 | B2 | 10/2004 | Noguchi et al. | 428/116 |
| 6,809,139 | B2 | 10/2004 | Fabian et al. | 524/430 |
| 6,814,774 | B2 | 11/2004 | Ishihara et al. | 55/523 |
| 6,843,822 | B2 | 1/2005 | Beall et al. | 55/523 |
| 6,864,198 | B2 | 3/2005 | Merkel | 501/80 |
| RE38,888 | E | 11/2005 | Beall et al. | 501/119 |
| 7,141,089 | B2 | 11/2006 | Beall et al. | 55/523 |
| 7,179,316 | B2 | 2/2007 | Merkel et al. | |
| 7,208,108 | B2 | 4/2007 | Otsuka et al. | |
| 7,247,184 | B2 | 7/2007 | Frost | 55/523 |
| 2003/0024219 | A1 | 2/2003 | Harada et al. | 55/523 |
| 2003/0039598 | A1 | 2/2003 | Nishimura et al. | 422/177 |
| 2004/0029707 | A1 | 2/2004 | Beall et al. | 501/9 |
| 2004/0152593 | A1 | 8/2004 | Cutler et al. | 502/439 |
| 2004/0261384 | A1 | 12/2004 | Merkel et al. | 55/523 |
| 2007/0006561 | A1 | 1/2007 | Brady et al. | 55/523 |
| 2007/0039297 | A1* | 2/2007 | Kawata et al. | 55/523 |
| 2007/0119133 | A1 | 5/2007 | Beall et al. | 55/523 |
| 2007/0119134 | A1 | 5/2007 | Beall et al. | 55/523 |
| 2007/0119135 | A1 | 5/2007 | Miao et al. | 55/523 |
| 2007/0141301 | A1 | 6/2007 | Boorom et al. | 428/116 |
| 2007/0234693 | A1 | 10/2007 | Miao et al. | 55/523 |
| 2007/0261378 | A1 | 11/2007 | Miao et al. | 55/523 |
| 2007/0272306 | A1 | 11/2007 | Trotin et al. | 137/455 |
| 2008/0047243 | A1 | 2/2008 | Beall et al. | 55/523 |
| 2008/0092499 | A1 | 4/2008 | Otsuka et al. | 55/307 |
| 2009/0062105 | A1 | 3/2009 | Custer et al. | 501/80 |
| 2009/0087613 | A1 | 4/2009 | Lu et al. | 428/117 |

FOREIGN PATENT DOCUMENTS

| | | |
|---|---|---|
| EP | 1 184 066 | 5/2004 |
| JP | 2000-302540 | 10/2000 |
| WO | 2004/002608 | 1/2004 |
| WO | 2006/030811 | 3/2006 |
| WO | 2006/068767 | 6/2006 |
| WO | 2006/130759 | 12/2006 |
| WO | 2008/027219 | 3/2008 |

OTHER PUBLICATIONS

Synthesis and sintering of cordierite from ultrafine particles of magnesium hydroxide and kaolinite. Sumi, Katsuhiro; Kobayashi, Yuichi; Kato, Etsuro. Dep. Applied Chem., Aichi Inst. Technol., Aichi, Japan. Journal of the American Ceramic Society (1998), 81(4), Abstract.

Kaolin-based cordierite for pollution control. Yamuna, A.; Johnson, R.; Mahajan, Y. R.; Lalithambika, M. Department of Physics, University of Kerala, Kariavattom, Trivandrum, India. Journal of the European Ceramic Society (2003), Volume Date 2004, 24(1), 65-73, Abstract.

Effects of particle size of alumina on the behaviors of tape casting and sintering of alumina-talc system. Yoon, Won-Gyun; Kim, Ho-Yang; Lee, Jung-A.; Kim, Jeong-Joo. Dep. Inorg. Mater. Eng., Kyungpook Nat. Univ., S. Korea. Yoop Hakhoechi (1997), 34(12), 1213-1220, Abstract.

* cited by examiner

CORDIERITE HONEYCOMB ARTICLE AND METHOD OF MANUFACTURE

RELATED APPLICATIONS

This application claims the benefit of U.S. Provisional Application 60/966,972 filed Aug. 31, 2007, entitled "Cordierite Honeycomb Article and Method of Manufacture."

BACKGROUND

1. Field

The present invention relates to ceramic honeycomb articles, and more particularly to porous cordierite ceramic honeycomb articles and methods for manufacturing same.

2. Technical Background

Recently, much interest has been directed towards the diesel engine due to its fuel efficiency, durability, and economical aspects. However, diesel emissions have been scrutinized both in the United States and Europe. As such, stricter environmental regulations will likely require diesel engines to be held to relatively high standards in terms of filtration efficiency. Therefore, diesel engine manufacturers and emission-control companies are working to achieve diesel engine emission control methods and apparatus which will meet such stringent emission requirements.

One of the biggest challenges in lowering diesel emissions is controlling the levels of diesel particulate material (PM) present in the diesel exhaust stream. Diesel particulate material consists mainly of carbon soot. The currently favored approach for removing carbon soot from diesel exhaust is through the use of diesel traps (otherwise referred to as "wall-flow filters" or "diesel particulate filters"). Diesel particulate filters capture soot in the diesel exhaust on and in the porous ceramic walls of the filter body. Diesel filters are described in, for example, U.S. Pat. Nos. 4,329,162, 4,415,344, 4,416,676, 4,417,908, 4,420,316, and 4,455,180. A design goal for diesel particulate filters is to provide for excellent filtration of soot without significantly hindering the exhaust flow, i.e., via providing relatively low back pressure. However, meeting both these goals simultaneously has proven very elusive. Additionally, as the layer of soot collects in the inlet channels and walls of the diesel particulate filter, the accumulating soot layer causes a gradual rise in the back pressure of the filter against the engine, thereby causing the engine to work harder. Thus, once the soot in the filter has accumulated to some level, the filter must be regenerated by burning out the soot, to restoring the back pressure again to low levels. Normally, this regeneration is accomplished under actively controlled conditions of engine management whereby a slow burn is initiated which lasts for a number of minutes, during which the temperature in the filter rises from a lower operational temperature to a maximum temperature. This burnout cycle has been referred to in the industry as an "active regeneration." Minimizing such events is preferred to maximize durability of the filter as well as to minimize fuel penalties. Further, minimizing peak temperatures during such events is desirable. Thus, filter configurations which may minimize regeneration events or reduce peak temperatures are sought after.

Cordierite, being a low-cost material, has been one material utilized for diesel exhaust filtration. To that end, porous cordierite ceramic filters of the wall-flow type have been utilized for the removal of particles in the exhaust stream from some diesel engines. A diesel particulate filter (DPF) ideally should combine low CTE (for thermal shock resistance), low pressure drop (for fuel efficiency), and high filtration efficiency (for a high level of removal of particles from the exhaust stream). Additionally, such filters should have high strength (to survive handling, canning, and vibration in use, for example). However, achieving this combination of features has proven very elusive with current state-of-the-art cordierite DPFs.

Thus, it would be considered a significant advancement to obtain a porous ceramic honeycomb article, made of cordierite, which exhibits high filtration efficiency coupled with low pressure drop.

SUMMARY

The present disclosure relates to ceramic honeycomb articles, and more particularly to porous ceramic honeycomb articles containing cordierite, preferably as a predominant crystalline phase. Embodiments have properties suitable for use in particulate filter applications, such as exhaust aftertreatment applications; most particularly in diesel exhaust filtration, for example.

According to embodiments disclosed herein, and in a first broad aspect, a porous ceramic honeycomb article has a relatively low median pore diameter, a relatively narrow pore distribution, and relatively low CTE. More particularly, the inventive ceramic honeycomb article comprises a porous ceramic honeycomb body containing cordierite and having a plurality of cell channels defined by intersecting porous walls. The walls include porosity having a pore size distribution wherein greater than or equal to 75% of the pore size distribution of the porosity of the porous walls, by volume, has a pore diameter ($d_v$) wherein $d_v < 10.0$ μm. Furthermore, less than or equal to 35% of the pore size distribution of the porosity of the porous walls, by volume, has a pore diameter $d_v \leq 4.0$ μm. Additionally, the large pore fraction of the distribution is controlled such that $d_{v90} \leq 14.0$ μm, or even $d_{v90} \leq 12.0$ μm. Further yet, such structure is achieved while exhibiting CTE$\leq 12.0 \times 10^{-7}$/° C. from 25° C. to 800° C., and in some embodiments, CTE$\leq 10.0 \times 10^{-7}$/° C. from 25° C. to 800° C., CTE$\leq 8.0 \times 10^{-7}$/° C. from 25° C. to 800° C., or even CTE$\leq 5.0 \times 10^{-7}$/° C. from 25° C. to 800° C. The inventive honeycombs may further exhibit high strain tolerance as witnessed by MOR/E-mod>600 ppm, or even>800 ppm. Moreover, thermal shock limits (TSL) of TSL$\geq 1000$ C may be achieved. Total porosities of % P$\geq 40$%, % P$\geq 45$%,% P$\geq 50$%, or even % P$\geq 55$% may be achieved by embodiments of the invention.

Additionally, and according to the disclosed embodiments, a ceramic honeycomb article further comprises a combination of relatively high strain tolerance and low coefficient of thermal expansion (CTE). In particular, according to this aspect, one embodiment is a porous ceramic body containing predominantly cordierite and having a plurality of cell channels defined by intersecting porous walls wherein the porous ceramic body exhibits the combination of MOR/E-mod>600 ppm, and CTE$\leq 8.0 \times 10^{-7}$/° C. wherein MOR is the modulus of rupture strength on a cellular sample in psi, E-mod is the room temperature elastic modulus, and CTE is the coefficient of thermal expansion measured between 25° C. and 800° C. As such, it should be recognized, that the present invention in one advantage, achieves relatively high strain tolerance and relatively low CTE. This combination generally provides good thermal shock properties.

In another broad characterization, the ceramic honeycomb article further comprises a combination of relatively high total porosity (% P) and a relatively large volume of small pores. Thus, according to this aspect, the embodiment is a porous ceramic honeycomb article, comprising a porous ceramic honeycomb body containing predominantly cordierite and having a plurality of cell channels defined by intersecting porous walls, said walls including a total porosity (% P) wherein % P≧40% and having a pore size distribution wherein greater than or equal to 75% of the pore size distribution of the porosity of the porous walls, by volume, has a pore diameter ($d_v$) less than 10.0 μm.

In addition, the median pore diameter may be controlled to be 4.0 μm≦$d_{v50}$<10.0 μm. Further, the small pore fraction of the distribution may be controlled such that less than or equal to 35% of the pores, by volume, have a pore diameter of $d_v$≦4.0 μm. Further, the small pore fraction of the distribution may be controlled such that greater than or equal to 75% of the pores, by volume, have a pore diameter of 4.0 μm≦$d_v$≦10.0 μm. In another aspect, the narrowness of the distribution may be controlled such that $d_{v10}$≧2.0 μm, or even $d_{v10}$≧3.0 μm. Further, $d_{v90}$≦14.0 μm, $d_{v90}$≦14.0 μm, or even $d_{v90}$≦12.0 μm. In yet another aspect, the narrowness of the pore size distribution may be controlled such that $d_{vf}$≦0.50, or even $d_{vf}$≦0.40. In certain exemplary embodiments, $d_{vf}$≦0.37, $d_{vf}$≦0.35, or even $d_{vf}$≦0.33 are demonstrated. Thus, ultra narrow pore size distribution is achieved by the invention. This, in another broad advantage, may provide low back pressure in use as a filter. Yet further, the large percentage of small pores is achieved while also achieving relatively low CTE, such as CTE≦12.0×10$^{-7}$/° C., CTE≦10.0×10$^{-7}$/° C., CTE≦8.0×10$^{-7}$/° C., CTE≦7.0×10$^{-7}$/° C., or even CTE≦5.0×10$^{-7}$/° C. all measured from 25-800° C. Again, such low CTE provides excellent thermal shock properties.

Similarly, the narrowness of the overall pore size distribution of the article, taking into account both the large pores and small pores in the pore size distribution, may be further characterized by exhibiting $d_{vb}$≦1.35, $d_{vb}$≦1.20, $d_{vb}$≦1.10, $d_{vb}$≦1.00, or even $d_{vb}$≦0.90 wherein $d_{vb}$=($d_{v90}$−$d_{v10}$)/$d_{v50}$. Controlling both the large and small pore content of the distribution may advantageously provide both low back pressure as well as excellent filtration efficiency, for example, FE0≧50%, FE0≧70%, or even FE0≧90%. Providing such ultra-narrow distribution combined with median pore diameter below 10.0 μm, in another broad advantage, reduces the peak temperature during regeneration events, thus contributing to enhanced durability.

The inventive ceramic honeycomb articles are suitable for use in high temperature applications, and are particularly suitable for use as diesel exhaust filtration devices because they exhibit combinations of low pressure drop and high filtration efficiency. Additionally, the honeycombs may exhibit good strength. To this end, in another aspect, there is provided a ceramic honeycomb article exhibiting the structure of a filter and the microstructure described above having an inlet end and an outlet end, a multiplicity of cells extending from the inlet end to the outlet end, the cells having porous walls, wherein at least some of the cells are plugged such that at least some of the exhaust flow is forced through the wall. For example, part of the total number of cells at the inlet end may be plugged along a portion of their lengths, and the remaining part of the cells that are open at the inlet end may be preferably plugged along a portion of their lengths, so that at least a portion of an engine exhaust stream passing through the cells of the honeycomb from the inlet end to the outlet end flows into the open cells, through the cells walls, and out of the article through the outlet end.

In another broad aspect, a porous ceramic honeycomb article comprises a porous cordierite ceramic structure having a plurality of cell channels defined by intersecting cell walls exhibiting a total porosity (% P) wherein % P≧40%, and a wall surface roughness (Ra) wherein Ra<4.0 μm, Ra<3.0 μm, Ra<2.8 μm, or even Ra<2.6 μm. Additionally, the porosity may be % P≧45%, or even % P≧50%.

In another broad aspect, a porous ceramic honeycomb article, comprising a porous cordierite ceramic structure having a plurality of cell channels defined by intersecting cell walls, said walls exhibiting a total porosity (% P) wherein % P≧40%, and a surface opening area of the walls having a surface opening diameter ($D_o$) wherein 10.0 μm≦$D_o$≦20.0 μm constitutes greater than 23%, greater than 30%, or even greater than 40%, of a total open surface area of the walls, as measured by SEM. Additionally, the surface opening diameter ($D_o$) wherein $D_o$>20.0 μm may constitute less than 65%, less than 60%, less than 50%, or even less than 45%, of a total open surface area of the walls.

In another broad aspect, a method for manufacturing a porous ceramic honeycomb article is provided. In particular, the method of manufacturing a honeycomb article comprises the steps of mixing a batch of inorganic batch components comprising talc having a median particle diameter ($d_{pt50}$) less than or equal to 20 μm and a silica-forming source having a median particle diameter ($d_{ps50}$) of less than or equal to 20 μm with a pore former having a median particle diameter ($d_{pp50}$) of less than or equal to 25 μm to form a plasticized batch. The plasticized batch is formed into a green honeycomb article, such as by extrusion. Thereafter, the green honeycomb article is fired, such as in a kiln or furnace, under conditions effective to form the ceramic honeycomb article containing a cordierite and wherein the article thus formed exhibits median pore diameter of 4.0 μm≦$d_{v50}$≦10.0 μm and $d_{vf}$≦0.50 wherein $d_{vf}$=($d_{v50}$−$d_{v10}$)/$d_{v50}$. Exemplary embodiments achieve $d_{vf}$≦0.37, $d_{vf}$≦0.35, or even $d_{vf}$≦0.33. Furthermore, such microstructure of the ceramic cordierite honeycomb may be achieved while also achieving CTE≦12.0×10$^{-7}$/° C., CTE≦10.0×10$^{-7}$/° C., CTE≦8.0×10$^{-7}$/° C., CTE≦7.0×10$^{-7}$/° C., or even CTE≦5.0×10$^{-7}$/° C. all measured from 25° C.-800° C.

Additional aspects of the invention will be set forth, in part, in the detailed description, figures, and any claims which follow, and in part will be derived from the detailed description, or can be learned by practice of the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention.

DESCRIPTION OF EXEMPLARY EMBODIMENTS

Figure 1:
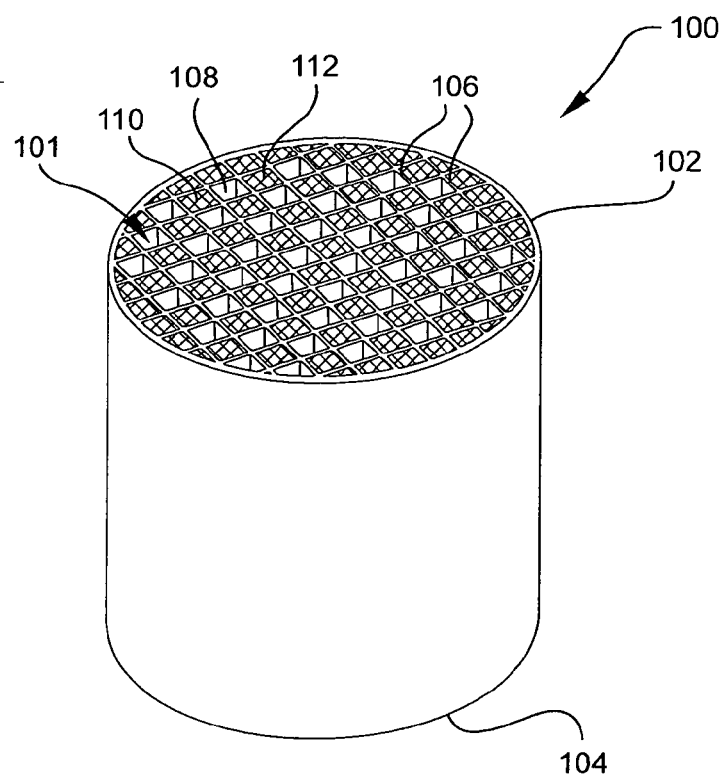
FIG. 1 is a perspective view of a ceramic honeycomb filter article according to the present invention.

The present invention can be understood more readily by reference to the following detailed description, examples, and claims, and their previous and following description. However, before the present articles and/or methods are disclosed and described, it is to be understood that this invention is not limited to the specific articles and/or methods disclosed unless otherwise specified, as such can, of course, vary. It is also to be understood that the terminology used herein is for the purpose of describing particular aspects only and is not intended to be limiting.

The following description is provided as an enabling teaching of the invention in its best, currently known embodiment. To this end, those skilled in the relevant art will recognize and appreciate that many changes can be made to the various aspects described herein, while still obtaining the beneficial results described. It will also be apparent that some of the desired benefits of the present invention can be obtained by selecting some of the features of the present invention without utilizing other features. Further, some or all of the advantages described may be achieved by various embodiments. Accordingly, many modifications and adaptations to the embodiment are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to an "silica-forming source" or an "alumina-forming source" may includes aspects of having two or more such forming sources, unless the context clearly indicates otherwise.

As used herein, a "wt. %" or "weight percent" or "percent by weight" of an organic component, unless specifically stated to the contrary, is based on the total weight of the total inorganics in which the component is included. All organic additions, such as, for example, pore formers and binders are specified herein as superadditions based upon 100% of the inorganics used.

As briefly introduced above, one embodiment is directed to a cordierite ceramic honeycomb article useful in, for example, porous ceramic filter applications. It has been found that cordierite honeycomb filters according to embodiments of the invention may include one or more of the following advantages and may achieve combinations of properties heretofore unachievable, especially in porous cordierite honeycomb filters. Accordingly, one broad potential advantage is a combination of high strain tolerance coupled with relatively low CTE (25° C. to 800° C.). In an additional advantage, combinations of relatively high strain tolerance and relatively high thermal shock limit (TSL) may be achieved.

TSL is described herein as:

$TSL = TSP + 500° C.$, and $TSP = MOR/\{[E\text{-mod}][CTE_H]\}$, and

Strain Tolerance = MOR/E-mod, where RT, as used herein, denotes room temperature (25° C.),
E-mod is the elastic modulus of the cellular structure at 25° C.,
MOR is a room temperature modulus of rupture strength (psi), and
$CTE_H$ is the high temperature thermal expansion coefficient, measured between 500° C. and 900° C. MOR, E-mod, and $CTE_H$ are all measured on a cellular specimen parallel to the length of the channels, also referred to as the axial direction. Modulus Of Rupture (MOR) was measured on a rectangular cellular bar having 4×1×½ inch dimensions in the axial direction by the four-point method. Furthermore, embodiments of the invention may exhibit, for example, desirable combinations of relatively high initial filtration efficiency (FE0) coupled with relatively low pressure drop back pressure (ΔP— both clean and soot loaded), across the filter.

Figure 5:
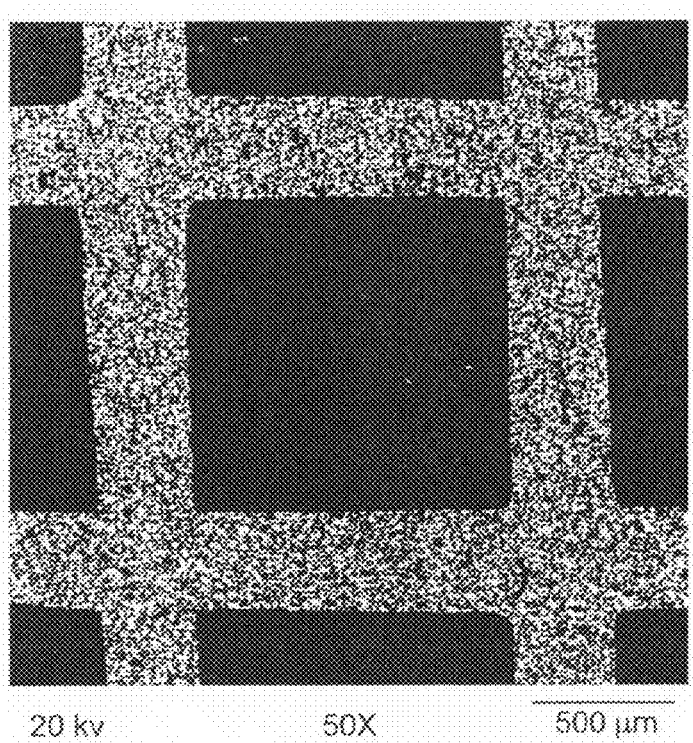
FIG. 5 is a micrograph image of a representative polished axial cross-sectioned microstructure of the inventive honeycomb at 50× magnification.
Figure 6:
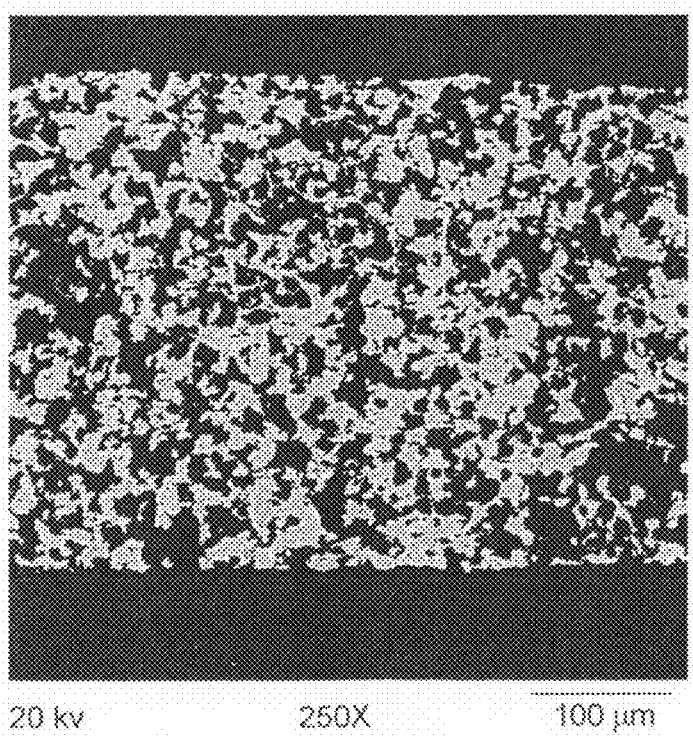
FIG. 6 is a micrograph image of a representative polished axial cross-sectioned microstructure of a wall of the inventive honeycomb at 250× magnification.
Figure 7:
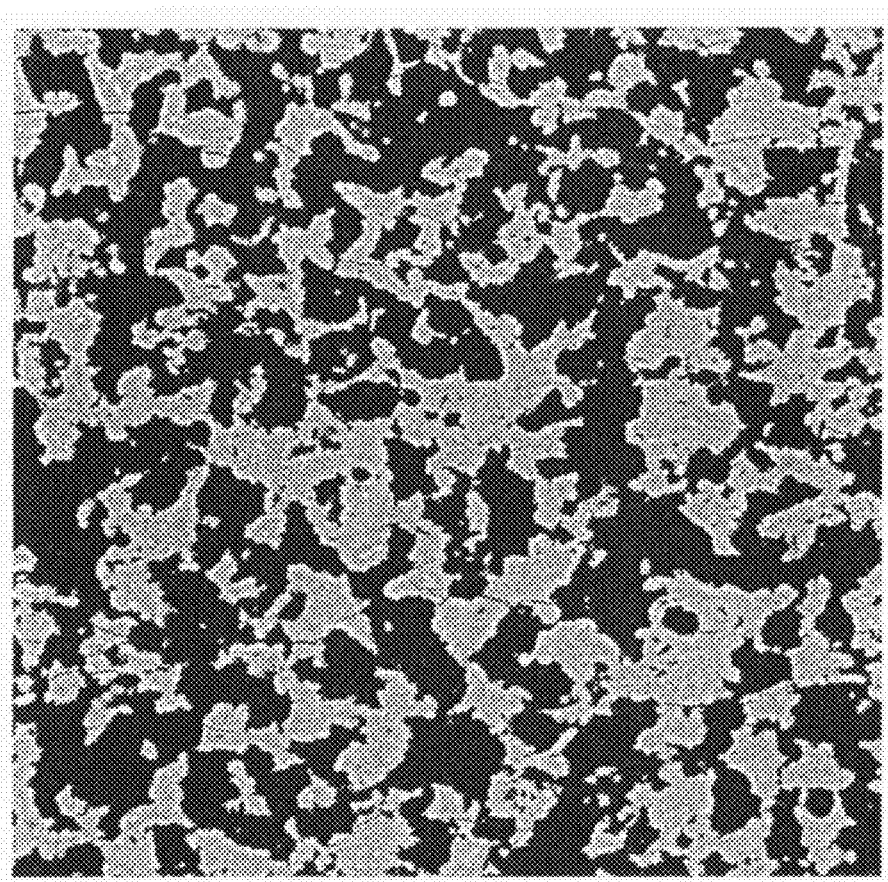
FIG. 7 is a micrograph image of a representative polished axial cross-sectioned microstructure of a portion of a wall of the inventive honeycomb at 500× magnification.

The unique porous ceramic microstructure of the porous walls of the honeycomb filter article of the invention is most useful for ceramic filter applications requiring relatively high initial filtration efficiency (FE0) coupled with low pressure drop (ΔP) across the filter. Polished axial cross-sections of a representative microstructure of a portion of a wall of the inventive honeycomb at 50×, 250×, and 500× magnification are shown in FIGS. 5-7, respectively. Such ceramic articles are particularly well suited for particulate matter filtration applications, such as in exhaust particulate filter applications and may provide high thermal durability in such applications.

In such particulate matter filtration applications, the ceramic honeycomb filter article 100 (FIG. 1) may take the form of a wall-flow filter, and may be comprised of be porous cordierite ceramic honeycomb body having a plurality of cell channels 101 extending between a first end 102 and a second end 104, for example. The honeycomb structure of the article 100 may include the plurality of generally parallel cell channels 101 formed by, and at least partially defined by, intersecting porous cell walls 106 (sometimes referred to as "webs") that extend from the first end 102 to the second end 104, and which are of generally constant thickness along the length thereof. The cordierite honeycomb article 100 may also include a skin 102 formed about and surrounding the plurality of cell channels. This skin 102 may be extruded during the formation of the honeycomb walls 106 or formed in later processing as an after-applied skin, by applying a skinning cement to the outer peripheral portion of the cells. In a preferred implementation, the cellular honeycomb structure consists of multiplicity of parallel cell channels 101 of generally square cross section formed into a honeycomb structure. Alternatively, other cross-sectional configurations may be used in the honeycomb structure, including rectangular, round, oblong, triangular, octagonal, hexagonal, or combinations thereof. Additionally, the cells may include larger inlet cells than outlet cells as described in U.S. Pat. Nos. 6,696,132, 6,843,822 or 7,247,184, for example. The corners may optionally contain radiuses.

The term "honeycomb" as used herein is defined as a structure of longitudinally-extending cells formed from cell walls 106, preferably having a generally repeating grid pattern therein. In such honeycomb filter applications, certain cells are designated as inlet cells 108 and certain other cells are designated as outlet cells 110. Moreover, in a cordierite honeycomb filter 100, at least some of the cells may be plugged with plugs 112. Generally, the plugs 112 are arranged at or near the ends of the cell channels and are arranged in some defined pattern, such as in the checkerboard pattern shown in FIG. 1, with every other cell being plugged at an end. The inlet channels 108 may be plugged at or near the outlet end 104, and the outlet channels 110 may be plugged at or near the inlet end 102 on channels not corresponding to the inlet channels. Accordingly, each cell may be plugged at or near one end only.

Optionally, the partially formed cells (truncated) adjacent the skin 102 may all plugged at one or even both ends or even all along the length thereof. The cell channels may be plugged with a cement paste having same or similar composition to that of the body, as described in U.S. Pat. Nos. 4,329,162, 6,809,139, or US Pat. App. Pub. US 2007/0272306, for example. The plugging process forms plugs 112 typically having a depth of about 5 mm to 20 mm, although this depth may vary and may include different depths at different parts of the filter. Plugging processes are described in U.S. Pat. Nos. 4,557,773, 4,573,896 or WO 2006/068767 for example.

Figure 2:
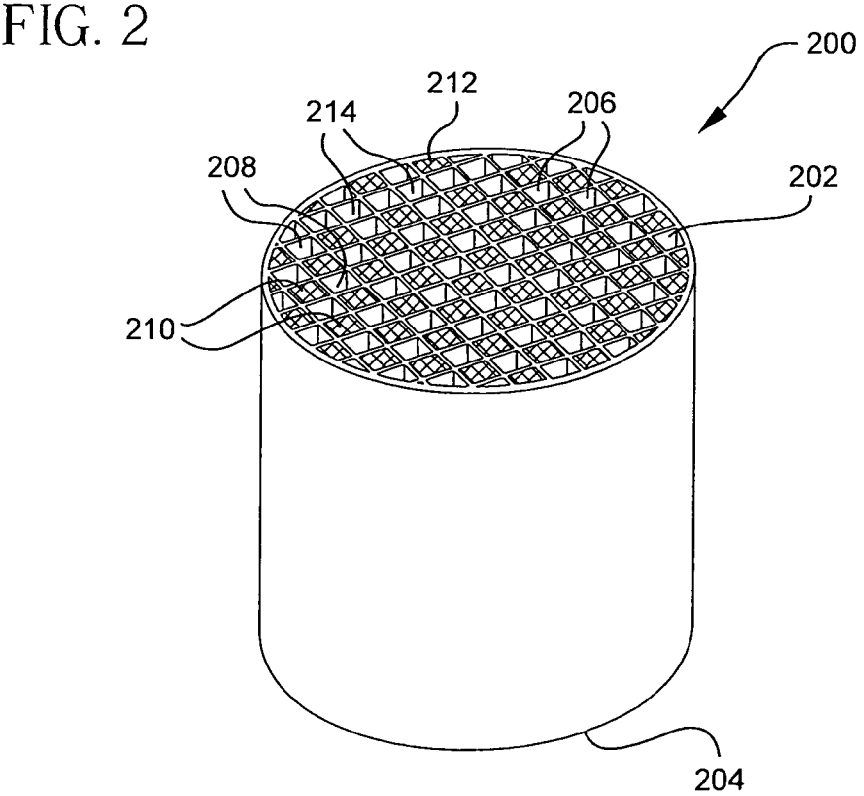
FIG. 2 is a perspective view of another ceramic honeycomb partial filter article according to the present invention.
Figure 8:
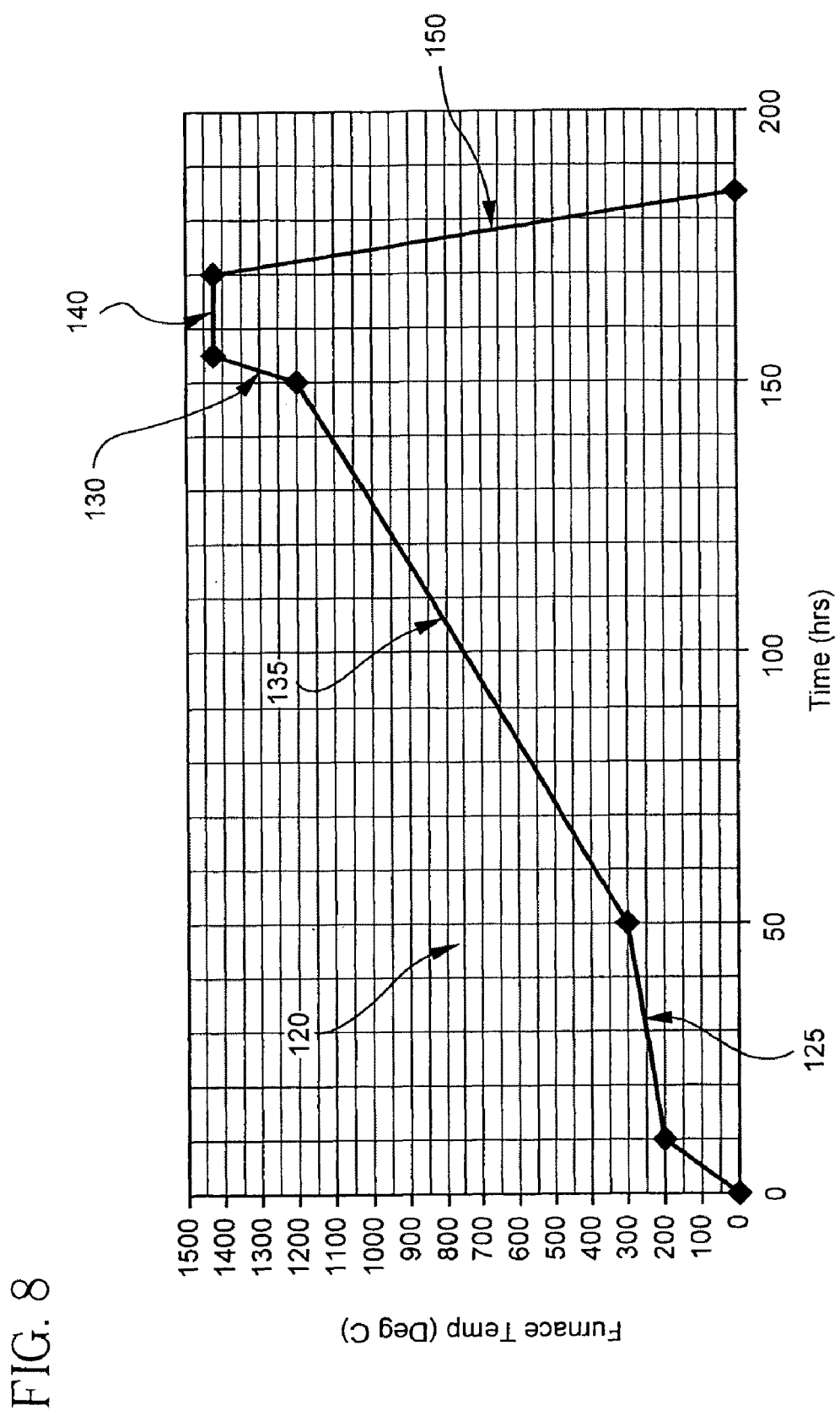
FIGS. 8-10 are graphical plots of exemplary firing schedules useful for manufacturing the inventive cordierite honeycomb articles.

Alternatively, other plugging patterns may be employed in the cordierite filter, such as described in U.S. Pat. No. 6,673,414, for example. Furthermore, some of the cells of the filter may be plugged other than at the ends such as shown in FIG. 8 of U.S. Pat. No. 6,673,414. In another alternate embodiment, some channels may be flow-through channels (unplugged along their entire length), and some may be plugged providing a so-called "partial filter" design as shown in FIG. 2 wherein the filter 200 includes intersecting porous walls 206, inlet cells 208 plugged with plugs (not shown) at the outlet end 204, outlet cells 210 plugged with plugs 212 at the inlet end and at least some flow through (unplugged) channels 214 where flow passes directly through the body without passing through the wall. In this partial filter embodiment, every other cell in every other row is a flow through channel 214. Thus, less than 50% of the channels may be unplugged. By way of explanation and not by limitation, the wall thickness of each porous cell wall 106 for the filter articles 100, 200 may be between about 0.004 inch to 0.030 inch (about 102 μm to 759 μm), for example. The cellular density of the honeycomb articles may be from about 50 cells/in$^2$ (7.8 cells/cm$^2$) to about 400 cells/in$^2$ (62 cells/cm$^2$), for example.

In accordance with further embodiments of the invention, and in another broad aspect, the present invention may be characterized in terms of its internal microstructure and/or surface microstructure, both of which exhibit structural features significantly different than heretofore described in the prior art.

Accordingly, in one broad characterization of the invention, a cordierite honeycomb filter article is provided, which comprises a porous ceramic body containing cordierite, preferably a predominant cordierite crystalline phase, and having a plurality of cell channels defined by intersecting porous walls. At least some of the cells may be plugged along their length. The porous ceramic body combines, in this aspect, relatively high strain tolerance with relatively low CTE. In particular, the porous ceramic body may exhibit MOR/E-mod>600 ppm, and CTE≦8.0×10$^{-7}$/° C. wherein MOR is a modulus of rupture strength on a cellular bar in psi, E-mod is a room temperature elastic modulus in psi, and CTE is a coefficient of thermal expansion measured between 25° C. and 800° C. Embodiments achieving CTE≦7.0×10$^{-7}$/° C. between 25° C. and 800° C., or even CTE≦5.0×10$^{-7}$/° C. between 25° C. and 800° C. are demonstrated by embodiments of the invention. Additionally, according to further embodiments, MOR/E-mod>700 ppm, or even MOR/E-mod>800 ppm are disclosed. Such relatively high strain tolerance and relatively low CTE may be achieved, while also exhibiting relatively high total porosity (% P) wherein % P≧40%, % P≧45%, % P≧50%, or even % P≧55%. Additionally, the median pore diameter ($d_{v50}$) of the invention may be controlled such that $d_{v50}$≦10.0 μm. Furthermore, controlling the median pore diameter ($d_{v50}$) of the porosity such that $d_{v50}$≧4.0 μm limits the amount of very small pores and thereby minimizes wash coated back pressure. For example, in a preferred implementation, the pore diameter distribution may be controlled such that 4.0 μm≦$d_{v50}$≦10.0 μm. Moreover, ($d_{v10}$) may be controlled such that $d_{v10}$≧2.0 μm. Additionally, the large pore fraction may be controlled such that $d_{v90}$≦12.0 μm thereby improving the initial filtration efficiency (FE0). In another characterization, a combination of relatively high total porosity (% P) and narrow pore size distribution with a median diameter ($d_{v50}$) below 10.0 μm is achieved. In particular, combinations are achieved whereby % P≧40%, % P≧45%, % P≧50%, or even % P≧55%, are combined with greater than or equal to 75% of a pore size distribution of the porous cell walls the porous ceramic body, by volume, have a pore diameter ($d_v$) less than 10 μm. This microstructure may provide TSL (as defined above) of greater than 1000° C., or even 1100° C.

In an alternative characterization of the invention, the cordierite honeycomb filter article, in another broad aspect contains cordierite, preferably a predominant cordierite crystalline phase, and comprises a pore microstructure provided in the porous walls of the fired ceramic body that may be characterized, as possessing a unique combination of relatively high total porosity (% P), relatively narrow pore size distribution (as characterized by $d_{vf}$), and relatively low median pore diameter ($d_{v50}$), all as measured by mercury porosimetry. Additionally, a relatively low coefficient of thermal expansion (CTE) between 25° C.-800° C., along at least one direction, may be achieved in combination with the aforementioned properties % P, $d_f$, and $d_{v50}$ wherein $d_{vf}$=($d_{v50}$−$d_{v10}$)/$d_{v50}$. Additionally, $d_{v10}$ and $d_{v90}$ may be controlled.

The parameters $d_{v10}$, $d_{v50}$, and $d_{v90}$ relate to the pore size distribution of the porosity and will be used herein, among other parameters, to define the relative narrowness of the pore size distribution. These parameters are determined by mercury porosimetry methods. The quantity $dv_{50}$ is the median pore diameter based upon pore volume, and is measured in μm; thus, $dv_{50}$ is the pore diameter at which 50% of the open porosity of the ceramic honeycomb article has been intruded by mercury. The quantity $dv_{90}$ is the pore diameter at which 90% of the pore volume is comprised of pores whose diameters are smaller than the value of $dv_{90}$; thus, $dv_{90}$ is equal to the pore diameter at which 10% by volume of the open porosity of the ceramic has been intruded by mercury. The quantity $dv_{10}$ is the pore diameter at which 10% of the pore volume is comprised of pores whose diameters are smaller than the value of $dv_{10}$; thus, $dv_{10}$ is equal to the pore diameter at which 90% by volume of the open porosity of the ceramic has been intruded by mercury. The values of $dv_{10}$ and $dv_{90}$ are also measured in μm.

In more detail, the cordierite honeycomb article of the invention may be characterized, in a broad aspect, as having a porous ceramic wall microstructure with desirable combinations of relatively high total porosity (% P), relatively low median pore diameter ($d_{v50}$), and relatively low d-factor ($d_{vf}$). According to embodiments, the median pore diameter $d_{v50}$≦10.0 μm, or even $d_{v50}$≦9.0 μm, or even $d_{v50}$≦8.0 μm, and in some embodiments $d_{v50}$≦7.0 μm. Additionally, the walls may include $d_{v50}$≧4.0 μm, $d_{v50}$≧5.0 μm or even $d_{v50} \geq 6.0$ µm. According to yet further embodiments, the distribution may be controlled such that 4.0 µm $\leq d_{v50} \leq 10.0$ µm.

Further, the pore size distribution of the open interconnected porosity of the porous walls according to embodiments is relatively narrow, in that the porosity may be controlled such that $d_{vf} \leq 0.50$, $d_{vf} \leq 0.40$, $d_{vf} \leq 0.37$, $d_{vf} \leq 0.35$, or even $d_{vf} \leq 0.33$, where $d_{vf}$ is a characterization of the relative width of the distribution of pore sizes finer than the median pore size, $d_{v50}$.

The total porosity (% P) of the porous walls of the inventive ceramic honeycomb article, as measured by mercury porosimetry, may be relatively high with values of % P$\geq$40%, % P$\geq$45%, % P$\geq$50%, or even % P$\geq$55% being demonstrated. In another aspect, the total porosity of the walls of the ceramic article is from greater than 40%$\geq$% P$\geq$60%. Achieving relatively high porosity (% P$\geq$40%) combined with relatively low median pore size ($d_{v50} \leq 10.0$ µm) while achieving sufficiently low back pressure ($\Delta$P) across the article, as a consequence of the narrow pore size distribution, may be advantageously achieved by the present invention. Further, when provided in filters, these combined properties of % P, $d_{v50}$, and $d_{vf}$ may provide relatively high initial filtration efficiency (FE$_0$) as high as FE$_0 \geq$45%, or even FE$_0 \geq$50%, FE$_0 \geq$60%, FE$_0 \geq$70%, FE$_0 \geq$80%, or even FE$_0 \geq$90%.

In still yet another aspect in addition to the combination of P$\geq$40%, $d_{v50} \leq 10.0$ µm, and $d_{vf} \leq 0.50$, additionally, the pore microstructure of the walls may be controlled such that $d_{v10} \geq 2.0$ µm, $d_{v10} \geq 2.5$ µm, $d_{v10} \geq 3.0$ µm, and in some embodiments, even $d_{v10} \geq 4.0$ µm. Additionally, in accordance with embodiments, the microstructure may, in addition to this combination, also include $d_{v90} \leq 12.0$ µm, $d_{v90} \leq 11.0$ µm, or even $d_{v90} \leq 10.0$ µm. According to additional characterizations of the embodiments, an ultra narrow pore size distribution may be achieved, as characterized by, $d_{v10} \geq 2.0$ µm and $d_{v90} \leq 12.0$ µm. Such ultra narrow pore size distribution may be achieved while additionally providing CTE$\leq 12.0 \times 10^{-7}$/° C. measured form 25° C.-800° C. in at least one direction.

The ultra narrow pore size distribution of the inventive ceramic articles may also be evidenced by the width of the distribution of pore sizes that are both finer and coarser than the median pore size, $d_{50}$. As used herein, the width of the distribution of pore sizes that are finer and coarser than the median pore size, $d_{50}$, are represented by a so called d-breadth value "$d_{vb}$" which is defined herein as:

$$d_{vb} = (d_{v90} - d_{v10})/d_{v50}.$$

To this end, the porous cordierite ceramic structure, in another broad aspect, may comprise a pore size distribution exhibiting $d_{vb} \leq 1.50$. In certain exemplary embodiments, $d_{vb} \leq 1.30$, or even $d_{vb} \leq 1.20$. Ultra narrow pore size distribution embodiments in accordance with the invention may exhibit $d_{vb} \leq 1.00$, or even $d_{vb} \leq 0.80$. Many embodiments exhibit desirable combinations of $d_{vb} \leq 1.00$, and 4.0 µm $\leq d_{v50} \leq 10.0$ µm, or even $d_{vb} \leq 0.80$, and 4.0 µm $\leq d_{v50} \leq 10.0$ µm.

Alternatively or additionally, the narrowness of the pore size distribution of the invention may be represented and characterized by the percentage of the porosity, by volume, having a pore diameter between pore size limits. According to embodiments, the porous honeycomb article may include greater than 60%, by volume, greater than 65%, greater than 70%, or even greater than 75% of the interconnected porosity having a pore diameter, $d_v$, of 4.0 µm $\leq d_v < 10.0$ µm. In some embodiments, the porous honeycomb article may include greater than 80%, by volume, or even greater than 85% of the interconnected porosity having a pore diameter, $d_v$, of 4.0 µm $\leq d_v < 10.0$ µm.

Another advantage of the inventive cordierite honeycomb article is a relatively low coefficient of thermal expansion (CTE) resulting in excellent thermal shock resistance (TSR). TSR is inversely proportional to CTE. That is, honeycomb ceramic articles with low thermal expansion have good thermal shock resistance and can survive the wide temperature fluctuations that are encountered in end use filter applications. Accordingly, in another broad aspect, the ceramic articles of the present invention may be characterized by having a relatively low coefficient of thermal expansion (CTE), measured by dilatometry in at least one direction. In particular, CTE$\leq 12.0 \times 10^{-7}$/° C., CTE$\leq 10.0 \times 10^{-7}$/° C., or even CTE$\leq 8.0 \times 10^{-7}$/° C. in at least one direction and across the temperature range of from 25° C. to 800° C. have been demonstrated. In other embodiments, CTE$\leq 7.0 \times 10^{-7}$/° C., CTE$\leq 6.0 \times 10^{-7}$/° C., CTE$\leq 5.0 \times 10^{-7}$/° C., or even CTE$\leq 4.0 \times 10^{-7}$/° C. in one direction and across the temperature range of from 25° C. to 800° C. have been demonstrated. In several outstanding exemplary embodiments of the invention, CTE$\leq 3.0 \times 10^{-7}$/° C., or even CTE$\leq 2.0 \times 10^{-7}$/° C., across the temperature range of from 25° C. to 800° C. have been achieved in at least one direction (see Ex. 1-2 and 14-15).

As a consequence of the relatively low CTE, and in another broad aspect, the ceramic honeycomb articles may be characterized by having a relatively high thermal shock limit (TSL) wherein TSL$\geq$1000° C., or even TSL$\geq$1100° C. TSL is defined herein above. Additionally, combinations of relatively low CTE, relatively high strain tolerance, and relatively high thermal shock limit may also be achieved. In particular, the porous ceramic honeycomb article of the invention may comprise combinations of CTE$\leq 7.0 \times 10^{-7}$/° C. between 25° C. and 800° C., MOR/e-Mod>600 ppm, and TSL$\geq$1000° C.

Furthermore, the ceramic honeycomb articles may be characterized by having a relatively high strain tolerance. Strain tolerance is defined as MOR/E-mod and is indicative of the materials ability to accommodate strain. Accordingly, it may be a measure of the materials ability to withstand cracking. Embodiments of the present invention have exhibited strain tolerance of greater than 500 ppm, greater than 600 ppm, greater than 700 ppm, or even greater than 800 ppm or 900 ppm.

In addition, the cordierite ceramic honeycomb articles may be characterized by having a relatively high level of microcracking. In particular, values of Nb$^3$, which are achieved by the invention, of greater than 2.0 are indicative of substantial microcracking in the porous ceramic. Similarly, ratios of E-mod$_{900}$/E-mod of greater than 1.05, as provided by the present invention, are also indicative of substantially microcracked ceramics.

In accordance with another broad aspect, the cordierite ceramic honeycomb filter article may be characterized broadly as comprising a pore size distribution characterized by a large percentage of relatively fine pores combined with relatively high porosity (% P). Conventional wisdom has indicated that such a cordierite filter structure would suffer from a large backpressure penalty. However, as discovered by the inventors, the microstructure of the inventive cordierite honeycomb enables a combination of relatively high initial filtration efficiency (as indicated by FE$_0$) with relatively low back pressure (as indicated by $\Delta$P). Accordingly, in one broad aspect, the cordierite honeycomb filter includes honeycomb walls which exhibit a pore size distribution of the porosity characterized by a percentage of pores (by volume) having a pore diameter ($d_v$) less than 10.0 μm being greater than or equal to 75% combined with total porosity (% P) being % P≧40%, % P≧45%, or even % P≧50%. In another aspect, the percentage of porosity (by pore volume) having a pore diameter $d_v$≦10 μm may constitute greater than 80%, greater than 85%, or even greater than 90% of the porosity. To minimize the propensity of such pores to be come blocked by subsequent alumina or other wash coating and thereby increase the wash-coated pressure drop across the filter article, it is desirable to minimize the amount of very small pores. In particular, it has been discovered that the % of the porosity with a pore diameter ($d_v$) wherein $d_v$≦4.0 μm may be made to be less than 35% (by volume), less than 30%, or even less than 20%. In selected embodiments, the % of the porosity with $d_v$≦4.0 μm may be less than 15%, less than 10%, or even less than 8% (by volume). Characterized another way, the % of the porosity with a pore diameter ($d_v$) wherein 4.0 μm≧$d_v$≦10.0 μm may be 60% or more, 70% or more, 80% or more, or even 85% or more, all by volume. In addition to the % P≧40% and the percentage of pores (by volume) having $d_v$<10.0 μm being greater than or equal to 75%, according to embodiments, the median pore diameter may be $d_{v50}$≦10.0 μm, $d_{v50}$≦9.0 μm, or even $d_{v50}$≦8.0 μm, and in some embodiments $d_{v50}$≦7.0 μm. Additionally, the walls may include $d_{v50}$≧4.0 μm, $d_{v50}$≧5.0 μm or even $d_{v50}$≧6.0 μm. According to yet further embodiments of the invention, 4.0 μm≦$d_{v50}$≦10.0 μm.

Furthermore, the large porosity fraction of the interconnected porosity may be controlled such that $d_{v90}$≦12.0 μm, $d_{v90}$≦11.0 μm, or even $d_{v90}$≦10.0 μm, and additionally, the small porosity fraction may be controlled such that $d_{v10}$≧2.0 μm, $d_{v10}$≧3.0 μm, or even $d_{v10}$≧4.0 μm. In addition to the relatively high porosity (% P≧40%) and relative large amount of small pores (≧75%) having $d_v$ less than 10.0 μm, the pore size distribution of the invention may be relatively narrow, as indicated by $d_{vf}$≦0.50, or even $d_{vf}$≦0.40. In exemplary embodiments illustrating ultra-narrow pore size distribution, $d_{vf}$≦0.37, $d_{vf}$≦0.35, or even $d_{vf}$≦0.33 are indicated. Most preferably, the porosity distribution is controlled such that 4.0 μm≦$d_{v50}$≦10.0 μm and $d_{vf}$≦0.50. The features are achieved while providing CTE≦12.0×$10^{-7}$/° C. from 25-800° C.

As one of skill in the art will appreciate, the elastic modulus (E-mod) of a material represents the relative stiffness of the material within the elastic range and can be determined from a stress-strain curve by calculating the ratio of stress to strain. In another aspect, the inventive ceramic honeycomb article of the invention may further exhibit E-mod≦900 (psi×$10^3$), E-mod≦800 (psi×$10^3$), or even E-mod≦(psi×$10^3$) for a 200/12 cell geometry (200 cpsi and $t_{wall}$=12 mil (305 μm)).

In accordance with another broad aspect of the invention, a method for manufacturing the inventive cordierite honeycomb articles described above is provided. To this end, it has been discovered that a ceramic honeycomb article having the aforementioned microstructure may be achieved from a ceramic precursor batch composition which comprises relatively fine talc, a relatively fine silica-forming source, and a relatively fine pore former. According to embodiments, a relatively fine starch may be used as the pore former, particularly corn or rice starch. However, starch such as tapioca or green mung bean may be used as well.

Accordingly, the method according to the present invention generally comprises the steps of first providing a plasticized ceramic precursor batch composition comprising inorganic ceramic forming batch components mixed together with a fine pore former (preferably having a median particle diameter of less than or equal to 25 μm), and processing aids.

The processing aids may include a liquid vehicle (such as water), and a binder such as a cellulose binder, and in particular, a hydroxypropyl methocellulose binder. The liquid vehicle may be added in an amount of 20-50 wt. % based on the 100% inorganic weight and is selected to achieve the desired formability, for example, in extrusion. The binder may be added in an amount of 2-10% wt. %, or even 3-8% wt. % based on the 100% inorganic weight. Other processing aids may be optionally added, such as a starch crosslinker, and/or a hydrocarbon compound. Preferred starch crosslinker include Berset 2700 whereas the preferred hydrocarbon compound may be ionene. These processing aids may improve processing and/or reduce drying and/or firing cracking and/or aid in producing desirable properties in the honeycomb article.

The plasticized ceramic precursor batch is formed into a green body having a desired honeycomb shape. The green body may then be preferably dried (such as by microwave, hot air, or RF drying), placed in a furnace or kiln, and fired under conditions effective to convert the green body into a ceramic article containing cordierite, preferably a predominant crystalline phase of cordierite. The inorganic batch components can be any combination of suitably fine inorganic components which can, upon firing, provide a primary sintered phase composition comprised of a cordierite containing ceramic and containing the desired microstructure. However, in particular, the inorganic ceramic forming batch component(s) may consist essentially of powdered components of relatively fine talc, a relatively fine silica-forming source, an alumina-forming source, and kaolin clay.

In one aspect, the inorganic batch components, pore formers, and firing cycle are further selected so as to yield a ceramic article comprising a predominant phase of cordierite (but may also include small amounts of mullite, spinel, or a mixture thereof) and which contains the fine microstructure described above. For example, and without limitation, in another aspect, the ceramic honeycomb article may comprise at least 97% by weight, or even at least 98% by weight of a cordierite crystalline phase. The cordierite phase produced consists essentially of, as characterized in an oxide weight percent basis, from about 49 to about 53 percent by weight $SiO_2$, from about 33 to about 38 percent by weight $Al_2O_3$, and from about 12 to about 16 percent by weight MgO. Moreover, its stoichiometry approximates $Mg_2Al_4Si_5O_{18}$.

To this end, the inorganic cordierite precursor powder batch composition may be appropriately adjusted to achieve the aforementioned oxide weights within the cordierite ceramic. It has been found that batch compositions which comprise between about 39 to 43 wt. % talc, about 15-18 wt. % of the silica-forming source, about 12-16 wt. % of a kaolin clay, and about 26-30 wt. % of an alumina-forming source provide excellent properties. According to embodiments, the alumina source may comprise a combination of alumina and hydrated alumina, for example. Combinations of about 22-27 wt. % alumina, and about 1-4 wt. % hydrated alumina may be used.

In more detail, the batch is made up of relatively fine particle size components of talc and silica-forming source. In particular, the talc has a median particle diameter ($d_{pt50}$) of less than or equal to 20.0 μm, or even $d_{pt50}$ less than or equal to about 15.0 μm. In some exemplary embodiments, $d_{pt50}$ of less than or equal to 10.0 μm is employed. According to further embodiments, the talc median particle diameter should be greater than or equal to 5.0 μm. All particle sizes herein are measured by a particle size distribution (PSD) technique, preferably by a Sedigraph by Micrometrics.

Exemplary alumina-forming sources may include any aluminum oxide or a compound containing aluminum which when heated to sufficiently high temperature yields essentially 100% aluminum oxide, such as alpha-alumina and/or hydrated alumina. Further non-limiting examples of alumina-forming sources include corundum, gamma-alumina, or transitional aluminas. The aluminum hydroxide may comprise gibbsite and bayerite, boehmite, diaspore, aluminum isopropoxide, and the like. The alumina-forming source may exhibit relatively fine median particle diameter of less than 5.0 µm, or even less than 2.0 µm. Most preferably, the alumina forming source has a median particle diameter of greater than 0.8 µm and less than 5.0 µm.

If desired, the alumina-forming source may also comprise a dispersible alumina-forming source. As used herein, a dispersible alumina-forming source is one that is at least substantially dispersible in a solvent or liquid medium and that can be used to provide a colloidal suspension in a solvent or liquid medium. In one aspect, a dispersible alumina-forming source can be a relatively high surface area alumina source having a specific surface area of at least 20 $m^2/g$, at least 50 $m^2/g$, or even at least 100 $m^2/g$. In an exemplary aspect, a suitable dispersible alumina source for use in the methods of the instant invention comprises alpha aluminum oxide hydroxide ($AlOOH.x.H_2O$) commonly referred to as boehmite, pseudoboehmite, and as aluminum monohydrate. In another exemplary aspect, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities.

The batch, in one aspect, may further comprise clay, such as for example, raw kaolin, calcined kaolin, and/or mixtures thereof. Exemplary and non-limiting clays include non-delaminated kaolinite raw clay and delaminated kaolinite. In particular, the kaolin may have a median particle diameter of less than or equal to 10.0 µm, or even less than or equal to 5.0 µm.

In a further aspect, it should also be understood that the silica-forming source may comprise, if desired, a silica raw material including fused $SiO_2$; colloidal silica; or crystalline silica, such as quartz or cristobalite. In particular, the silica-forming source may have a median particle diameter ($d_{ps50}$) of less than or equal to 20.0 µm, less than or equal to 15.0 µm, less than or equal to 10.0 µm, or even less than or equal to 5.0 µm.

As set forth above, the plasticized ceramic precursor batch composition further comprises a relatively fine pore former. As will be appreciated by one of ordinary skill in the art, a pore former is a fugitive particulate material which evaporates or undergoes vaporization by combustion during drying or heating of the green body to obtain a desired, usually larger porosity than would otherwise be obtained. It has been discovered that the use of certain fine particle size starch pore formers, preferably corn or rice starches, together with the fine inorganics (fine talc and fine silica-forming source) as described above, enables the manufacture of ceramic articles possessing the unique combination of microstructure and physical properties. A suitable starch for use in the use in the instant method may, in one aspect, comprise a median particle size ($d_{pp50}$) less than or equal to 25 um, less than or equal to 20 um, less than or equal to 15 um, or even less than or equal to 10 um. Additionally, the starch may comprises green mung bean or tapioca starch. Furthermore, the starch can be present in any wt. % effective to provide the desired total porosity, for example, % P≧40%. However, in one aspect, the corn starch is present in an amount in the range of about 7.5-30 wt. % relative to the total weight of the inorganic batch components, or even between about 10-20 wt. %. The inorganic powder batch components and the pore former can be intimately dry blended and may be charged to a Littleford mixer and mixed with the liquid vehicle (water) and forming aids and kneaded for approximately 5-20 minutes to provide a final plasticized ceramic batch mixture. The plasticized batch includes plastic formability and green strength that enable it to be shaped into a honeycomb body.

Forming may be done by, for example, molding or extrusion through a die. When forming is done by extrusion, most typically a cellulose ether binder such as methylcellulose, hydroxypropyl methylcellulose, methylcellulose derivatives, and/or any combinations thereof, serve as a binder. A lubricant such as tall oil, sodium stearate, or oleic acid may also be used. The relative amounts of vehicle and forming aids can vary depending on factors such as the nature and amounts of raw materials used, etc. For example, the typical amounts of forming aids are about 2% to about 10% by weight of methyl cellulose, and preferably about 3% to about 5% by weight, and about 0.5% to about 2% by weight of lubricant. The pore former, binder, and lubricant and/or surfactant are added as superadditions based upon wt. % of 100% of the inorganic materials. The amount of water vehicle addition can vary from one batch of materials to another and therefore is determined by pre-testing the particular batch for extrudability. The liquid vehicle addition included may be between about 20% and 50%, or more preferably between about 20% to 35 wt. %, as a superaddition based upon wt. % of 100% of the inorganic materials, and is preferably water. Additionally, the batch may include a starch crosslinker, such as a polycycloamine condenser sold as Berset 2700, provided in about 5 wt. % based on 100% weight of the starch.

The resulting stiff, uniform, and extrudable plasticized ceramic precursor batch composition can then be shaped into a green honeycomb body by any known conventional ceramic forming process, such as, e.g., extrusion. In an exemplary aspect, extrusion can be done using a hydraulic ram extrusion press, or a two stage de-airing single auger extruder, or a twin screw mixer with a die assembly attached to the discharge end.

Once dried, the green body can thereafter be fired under conditions effective to convert the green honeycomb body into a ceramic honeycomb article comprising a primary crystalline phase ceramic as described herein.

The firing conditions effective to convert the green honeycomb body into a ceramic honeycomb article can vary depending on the process conditions such as, for example, the specific composition, size of the green honeycomb body, and nature of the equipment used. To that end, in one aspect, the optimal firing conditions specified herein may need to be adapted for very large cordierite structures, i.e., slowed down, for example. The specific firing schedules employed for the examples are further described herein.

However, to aid in producing the properties of the invention, firing schedules may be employed which ramp quickly from 1200° C. to a maximum hold temperature at or above 1420° C., or even at or above 1425° C. The quick ramp rate should be 50° C./hr or higher, and the green honeycomb bodies may be held for 5 to 20 hours, more preferably between about 10 hours to about 15 hours. In still another aspect, the green body can be fired at a soak temperature in the range of from about 1420° C. to about 1435° C. In still yet another aspect, the green body may be fired at a soak temperature in the range of from about 1425° C. to about 1435° C. Most preferably, the firing cycle includes a quick ramp rate of 50° C./hr or higher and a soak temperature in the range of from about 1420° C. to about 1435° C. for a sufficient time to form the cordierite phase.

The total firing times may range from approximately 40 to 250 hours, largely dependent on the size of the honeycomb fired, during which a maximum soak temperature is reached and held for a sufficient time described above. A preferred firing schedule includes ramping from 1200° C. at a rate above 50° C./hour and firing at a soak temperature of between about 1425° C. and 1435° C. for between about 10 hours to about 15 hours.

In more detail, a suitable firing cycle which may be used to manufacture the present invention is shown and described with reference to FIG. 8. For example, an average firing rate may be employed in the first firing portion 120, for example, having an average rate of between about 20° C./hour and about 70° C./hour between room temp and about 1200° C. The first portion 120 may include a pore former burnout stage 125 which may be a hold or slight ramp within the range of pore former burnout temperature to minimize cracking and temperature differentials between the skin a core of the honeycomb, followed by an intermediate ramp 135 to about 1200° C. Furthermore, the firing cycle may comprise a relatively faster ramp rate within an upper portion 130 at higher temperatures within the firing cycle above 1200° C. This fast ramp in portion 130 may be coupled with a hold portion 140 at a temperature above 1420° C., or even at or above 1425° C., and preferably between 1420° C. and 1435° C. whereby during the hold, the cordierite crystalline phase is formed. The ramp rate in the region 130 may be 50° C./hour or more, 75° C./hour or more, 100° C./hour or more, or even 120° C./hour or more. By utilizing the faster ramp rate in upper portion 130 above about 1200° C. and the relatively high hold temperature (above 1420° C.), unique microstructure characteristics of the invention may be achieved while also providing the relatively low CTE. In particular, the firing cycle aids in reducing the relative amount of fine porosity below 4.0 μm. The reduction mechanism is thought to be from the promotion of viscous flow of the cordierite forming components such that the fine pores are filled by viscous flow of the components during the initial formation of the cordierite phase. Following the fast ramp, the honeycomb is held at in the hold temperature range for a suitable time, such as 5 to 20 hours, to form the cordierite phase. After this, the honeycomb article is cooled to room temperature in portion 150. The cooling rate is slow enough to produce no cracking and is dependent on the size of the part fired, for example.

Figure 9:
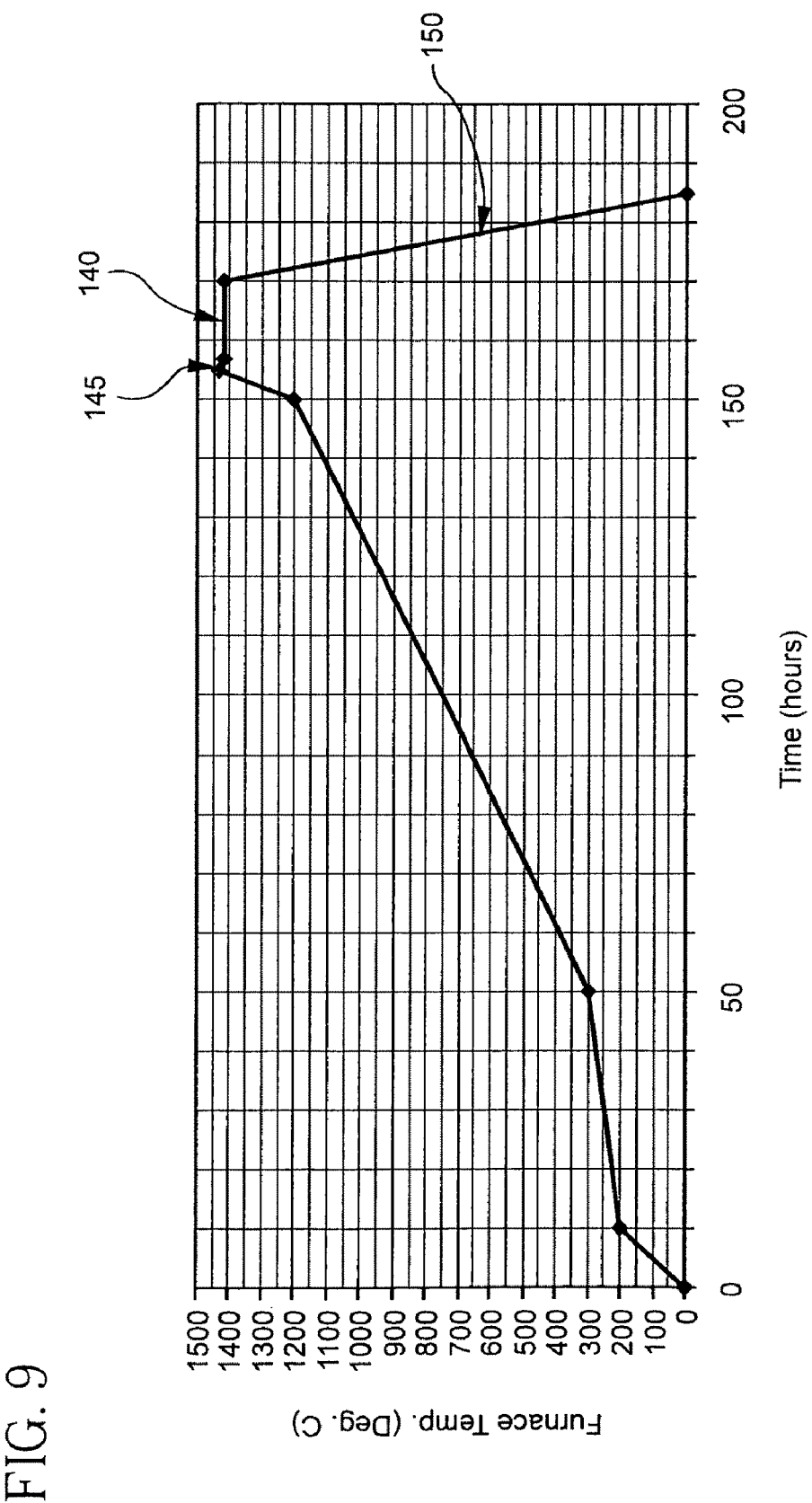
Figure 10:
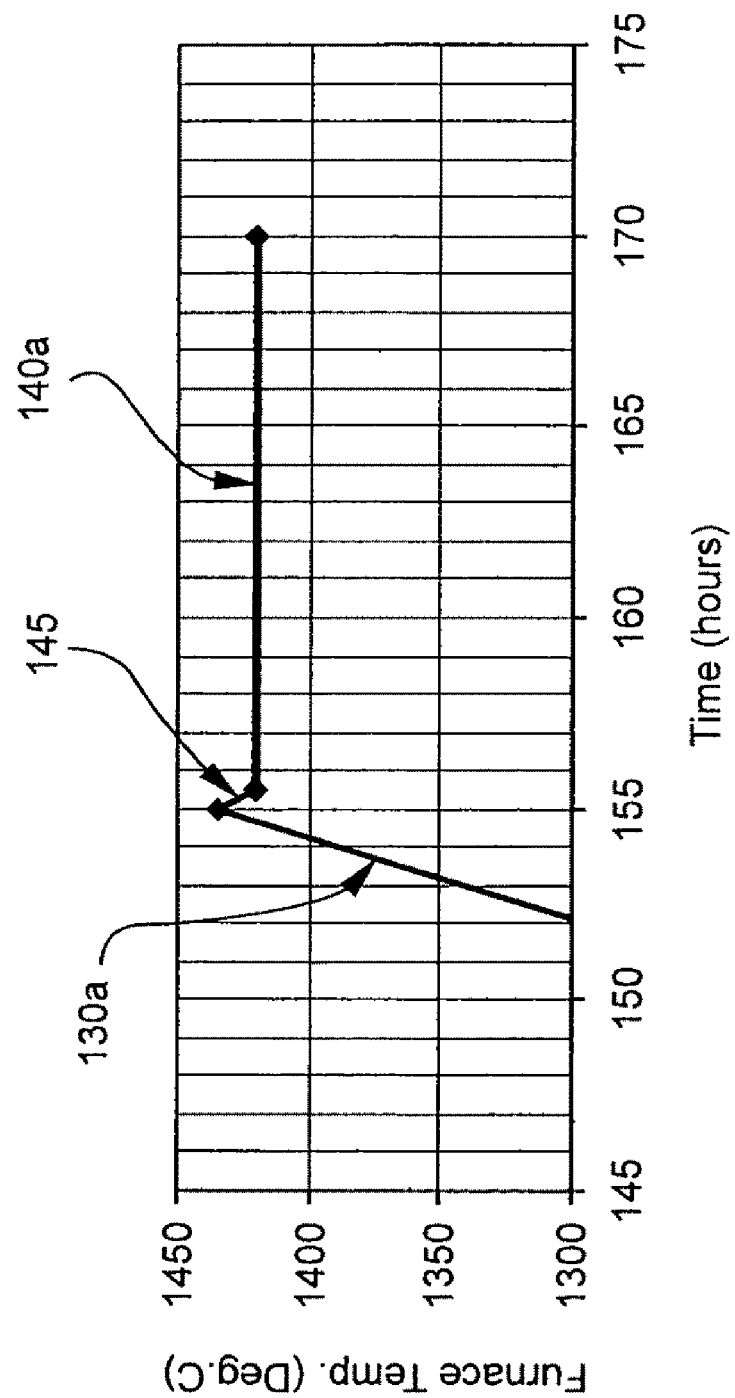

Optionally, the green body of the invention may be fired by utilizing the firing cycle illustrated in FIGS. 9-10, for example. In this representative cycle, the firing takes place as hereto before mentioned, except that the firing cycle includes a temperature spike 145, just prior to the hold, and to a higher peak temperature above the hold temperature for a short duration, followed by a more standard hold 140a, as apposed to the relatively elevated hold described above. This spike to peak temperature is preceded by a fast ramp in the portion 130a from 1200° C. to the peak 145. Preferably also, the ramp rate from 1200° C. to the peak 145 is 50° C./hour or more, 75° C./hour or more, 100° C./hour or more, or even 120° C./hour or more. Preferably the peak 145 is at least 1425° C., at least 1430° C., at least 1435° C. or even at least 1440° C., and is preferably at least 5° C. above the hold 140a, 10° C. or more above, or even 15° C. or more above the hold 140a. Preferably, the peak is between 1425° C. and 1440° C. One suitable exemplary firing cycle includes a peak 145 of 1435° C. followed by a hold 120a at about 1425° C. The peak 145 should be of very short duration, such as less than 1 hour, or even less than a ½ hour, such that the fine porosity below 4.0 μm is filled and substantially reduced, but desired coarser porosity (from 4.0 to 10 μm) is not also destroyed by the viscous flow phenomena.

EXAMPLES

To further illustrate the principles of the present invention, the following examples are put forth so as to provide those of ordinary skill in the art with a complete disclosure and description of the porous cordierite ceramic honeycomb articles and methods claimed herein. They are intended to be purely exemplary of the invention and are not intended to limit the scope of what the inventors regard as their invention.

Numerous exemplary embodiments of inventive and comparative cordierite honeycomb articles were prepared using various combinations of starting raw materials, including, talc, kaolin clay, alumina-forming sources, silica-forming sources, binder, pore former, and liquid vehicle. The specific inventive powder batch compositions used to prepare the inventive cordierite honeycomb articles are set forth in the Table 2-4 below. Further, exemplary properties for the inventive example (Table 5-7) and also comparative (Table 1) cordierite honeycomb article examples are provided below.

TABLE 1

Properties of Comparative Examples

| PARAMETER | C1 | C2 | C3 | C4 |
|---|---|---|---|---|
| % P (%) | 49.3 | 43.3 | 52.3 | 53.6 |
| $d_{v50}$ (μm) | 13.7 | 13.3 | 19.7 | 14.6 |
| $d_{v10}$ (μm) | 4.1 | 6.9 | 9.8 | 5.1 |
| $d_{v90}$ (μm) | 30.7 | 32.9 | 39.8 | 34.6 |
| $d_{vf} = (d_{v50} - d_{v10})/d_{v50}$ | 0.70 | 0.49 | 0.42 | 0.65 |
| $d_{vb} = (d_{v50} - d_{v10})/d_{v50}$ | 1.95 | 1.94 | 1.52 | 2.03 |
| % of porosity ≧ 100 μm | 1.7 | 1.5 | 2.4 | 2.5 |
| % of porosity ≦ 10.0 μm | 30.5 | 25.8 | 4.8 | 37.9 |
| % of porosity ≦ 4.0 μm | 9.9 | 4.7 | 1.0 | 8.0 |
| 4.0 μm ≦ % of porosity ≦ 10.0 μm | 20.6 | 21.1 | 3.8 | 29.9 |
| MOR (psi) | 354 | 554 | 292 | 290 |
| E-mod (×10³ psi) | 796 | 993 | 520 | 640 |
| MOR/E-mod (ppm) | 444 | 557 | 561 | 453 |
| CTE × 10⁷/° C. (25-800° C.) | 1.5 | 6.0 | 5.0 | 4.0 |
| $CTE_H$ (500-900° C.) × 10⁷ | 9.2 | 12.9 | 11.8 | 10.9 |
| TSP (° C.) | 482 | 431 | 475 | 416 |
| TSL (° C.) | 982 | 931 | 975 | 916 |
| ΔP at 5 g/l, 26.25(210) scfm | 7.8 | 7.0 | 5.4 | 6.4 |
| Ra (μm) | 6.53 | n.a | 7.37 | n.a |

Table 1 above illustrates that comparative ceramic honeycomb articles of the "prior art" do not contain certain desirable combinations of properties achieved by the present invention. Namely, the comparative ceramic honeycomb articles do not achieve, for example, combinations of relatively narrow pore size distribution, relatively low median pore diameter below 10.0 μm, and relatively low CTE. Further, they do not achieve combinations of relatively high strain tolerance and relatively low CTE. Additionally, combinations of high strain tolerance and high thermal shock limit (TSL) are not achieved. Moreover, combinations of relatively high initial filtration efficiency ($FE_0$) and relatively high porosity (% P) are also not achieved.

It should be recognized that the microstructure according to the present invention represents an extreme departure from the general direction of development of cordierite honeycombs within the emissions control industry, namely, a push towards higher porosity and higher median pore diameter. Accordingly, conventional wisdom has been that porous cordierite particulate filters having low median pore diameter and high porosity would be undesirable in that they would exhibit back pressure that is relatively too high. However, the inventors herein have discovered that when relatively low median pore diameter is utilized in a relatively high porosity article and an ultra-low pore size distribution is provided, then relatively low back pressure (both clean and soot loaded) may be achieved while simultaneously achieving high filtration efficiency, especially relatively high initial $FE_0$. This combination may be achieved while also exhibiting relatively lower CTE. This combination, prior to the present invention, has not achievable by any known cordierite honeycombs.

Exemplary example batches of porous cordierite ceramic honeycombs as well as suitable firing cycles are described in Tables 2-4 below.

TABLE 2

Inventive Example Batches

| Batch Example | B1 | B2 | B3 | B4 | B5 | B6 | B7 |
|---|---|---|---|---|---|---|---|
| Talc (%) | 41.54 | 41.54 | 41.54 | 41.54 | 41.54 | 41.54 | 41.54 |
| Silica (%) | 16.59 | 17.1 | 16.59 | 16.59 | 16.59 | 16.59 | 17.1 |
| Alumina (%) | 25.53 | 25.53 | 25.53 | 25.53 | 25.53 | 25.53 | 25.53 |
| Clay (%) | 13.85 | 13.85 | 13.85 | 13.85 | 13.85 | 13.85 | 13.85 |
| Starch (%) | 15 | 20 | 20 | 20 | 20 | 20 | 20 |
| $Al_2O_3$ (%) | 2.50 | 2.50 | 2.50 | 2.50 | 2.50 | 2.50 | 2.50 |
| Crosslinker (%) | 0.5 | 0.5 | 0.5 | 0.5 | 0.5 | 0.5 | 0.5 |
| Ionene (%) | 0.03 | 0.03 | 0.03 | 0.03 | 0.03 | 0.03 | 0.03 |
| Particle size | | | | | | | |
| Talc (μm) | 15 | 15 | 15 | 15 | 5 | 5 | 15 |
| Starch (μm) | 15 | 15 | 15 | 15 | 15 | 15 | 7 |
| Silica (μm) | 5 | 5 | 5 | 5 | 5 | 5 | 5 |
| Alumina (μm) | 1.8 | 1.8 | 1.8 | 1.8 | 1.8 | 1.8 | 1.8 |
| Firing | | | | | | | |
| Rate from 1200 (° C./hr) | 50 | 50 | 50 | 50 | 50 | 50 | 50 |
| Peak T (° C.) | 1435 | 1435 | 1435 | 1430 | 1435 | 1430 | 1435 |
| Hold T (° C.) | 1425 | 1425 | 1425 | 1430 | 1425 | 1430 | 1425 |
| Time from Peak to Hold (min.) | 8 | 8 | 8 | 0 | 8 | 0 | 8 |
| Time at Hold (hr) | 10 | 10 | 10 | 15 | 10 | 15 | 10 |

TABLE 3

Inventive Example Batches

| Batch Example | B8 | B9 | B10 | B11 | B12 | B13 | B14 |
|---|---|---|---|---|---|---|---|
| Talc (%) | 41.54 | 41.54 | 41.54 | 41.54 | 41.54 | 41.54 | 41.54 |
| Silica (%) | 17.1 | 17.1 | 17.1 | 17.1 | 17.1 | 17.1 | 17.1 |
| Alumina (%) | 25.53 | 25.53 | 25.53 | 25.53 | 25.53 | 25.53 | 25.53 |
| Clay (%) | 13.85 | 13.85 | 13.85 | 13.85 | 13.85 | 13.85 | 13.85 |
| Starch (%) | 20 | 20 | 20 | 20 | 20 | 20 | 7.5 |
| $Al_2O_3$ (%) | 2.50 | 2.50 | 2.50 | 2.50 | 2.50 | 2.50 | 2.50 |
| Crosslinker (%) | 0.5 | 0.5 | 0.5 | 0.5 | 0.5 | 0.5 | 0.5 |
| Ionene (%) | 0.03 | 0.03 | 0.03 | 0.03 | 0.03 | 0.03 | 0.03 |
| Particle size | | | | | | | |
| Talc (μm) | 15 | 5 | 5 | 15 | 15 | 5 | 15 |
| Starch (μm) | 7 | 7 | 7 | 15 | 15 | 15 | 15 |
| Silica (μm) | 5 | 5 | 5 | 5 | 5 | 5 | 5 |
| Alumina (μm) | 1.8 | 1.8 | 1.8 | 1.8 | 1.8 | 1.8 | 1.8 |
| Firing | | | | | | | |
| Rate from 1200 (° C./hr) | 50 | 50 | 50 | 75 | 75 | 75 | 50 |
| Peak T (° C.) | 1430 | 1435 | 1430 | 1435 | 1435 | 1435 | 1430 |
| Hold T (° C.) | 1430 | 1425 | 1430 | 1425 | 1425 | 1425 | 1430 |
| Time from peak to Hold (min.) | 0 | 8 | 0 | 8 | 8 | 8 | 0 |
| Time at Hold (hr) | 15 | 10 | 15 | 10 | 10 | 10 | 15 |

TABLE 4

Inventive Example Batches

| Batch Components | B15 | B16 | B17 | B18 | B19 | B20 | B21 |
|---|---|---|---|---|---|---|---|
| Talc (%) | 41.54 | 41.54 | 41.54 | 41.54 | 41.54 | 41.54 | 41.54 |
| Silica (%) | 17.1 | 17.1 | 16.59 | 16.59 | 16.59 | 16.59 | 17.1 |
| Alumina (%) | 25.53 | 25.53 | 25.53 | 25.53 | 25.53 | 25.53 | 28.03 |

TABLE 4-continued

Inventive Example Batches

| Batch Components | B15 | B16 | B17 | B18 | B19 | B20 | B21 |
|---|---|---|---|---|---|---|---|
| Clay (%) | 13.85 | 13.85 | 13.85 | 13.85 | 13.85 | 13.85 | 13.85 |
| Starch (%) | 10 | 15 | 15 | 15 | 15 | 20 | 20 |
| $Al_2O_3$ (%) | 2.50 | 2.5 | 2.5 | 2.5 | 2.5 | 2.50 | 0 |
| Crosslinker (%) | 0.5 | 0.5 | 0.5 | 0 | 0.5 | 0.5 | 0 |
| Ionene (%) | 0.03 | 0.05 | 0.05 | 0.05 | 0 | 0.03 | 0 |
| Particle size | | | | | | | |
| Talc (μm) | 15 | 15 | 15 | 15 | 15 | 5 | 15 |
| Starch (μm) | 15 | 15 | 15 | 15 | 15 | 15 | 15 |
| Silica (μm) | 5 | 13 | 13 | 5 | 5 | 5 | 5 |
| Alumina (μm) | 1.8 | 1.8 | 1.8 | 1.8 | 1.8 | 1.8 | 1.8 |
| Firing | | | | | | | |
| Rate from 1200 (° C./hr) | 50 | 50 | 50 | 50 | 50 | 50 | 75 |
| Peak T (° C.) | 1430 | 1430 | 1430 | 1430 | 1430 | 1435 | 1435 |
| Hold T (° C.) | 1430 | 1430 | 1430 | 1430 | 1430 | 1415 | 1435 |
| Time from Peak to Hold (min.) | 0 | 0 | 0 | 0 | 0 | 16 | 0 |
| Time at Hold (hr) | 15 | 15 | 15 | 15 | 15 | 10 | 15 |

In particular, the fired porous cordierite ceramic honeycomb articles may include a chemical composition, on an oxide wt. % basis, of 42-56% $SiO_2$, 30-45% $Al_2O_3$, and 12-16% MgO, and preferably comprises cordierite having a stoichiometry of approximately $Mg_2Al_4Si_5O_{18}$. A detailed description of a suitable firing schedule which may be used in forming the present invention is described in co-pending U.S. Provisional Patent Application Ser. No. 60/967,219 filed on Aug. 31, 2007 and entitled "Method of Firing Green Bodies Into Porous Ceramic Articles," the disclosure of which is hereby incorporated by reference herein.

The compositional examples above were fired to provide resulting inventive cordierite honeycomb articles having the microstructure and properties as described herein. Exemplary firing schedules are shown in FIGS. 8-10 illustrating the furnace temperature (° C.) versus firing time (hours) and are describe in detail above.

The resulting fired porous cordierite honeycomb articles were then evaluated to determine their relevant physical properties, such as for example, CTE, total porosity (%P), median pore diameter (MPD), pore size distribution (including $d_{v10}$, $d_{v50}$, $d_{v90}$, $d_{vf}$ and $d_{vb}$, % Porosity≦10.0 μm, % Porosity≦4.0 μm, and 4.0 μm≦% Porosity≦10.0 μm), % cordierite, % Spinel, % mullite, elastic modulus (E-mod), modulus of rupture (MOR), strain tolerance (MOR/E-mod), TSP, TSL, surface roughness (Ra), and the % of open surface area below 20 μm and 10 μm. CTE was measured by dilatometry in the axial direction (parallel to the cell channels). All measurements of pore microstructure were made by mercury porosimetry using an Autopore IV 9520 by Micrometrics. Elastic (Young's) modulus (E-mod) was measured on a cellular bar in the axial direction using a sonic resonance technique. The test results are reported in Tables 5-7 below.

An examination of the data set forth in Tables 5-7 below indicates the ability for an inventive batch composition to provide a resulting fired porous cordierite ceramic body having the unique combination of microstructure and performance properties described herein. Specifically, unique combinations of properties may be achieved. For example, suitable relatively low median pore diameter, relatively narrow pore size distribution, and relatively low CTE may be simultaneously achieved.

A study of inventive compositions comprising combinations of various fine starches, fine talc, and fine silica-forming sources was conducted to illustrate the effects of fine median particle diameter and alternative firing schedules on the resulting fired porous cordierite ceramic articles. To this end, green honeycomb bodies formed by extrusion and comprised of various inventive batch compositions were fired under firing conditions set forth in Tables 2-4 above. Specifically, the firing schedules reflect alternative combinations of hold temperature, peak temperature, time from peak to hold, hold time, and average ramp rates above 1200° C. The variations in the resulting properties and the pore size distributions of the articles are set forth in Tables 5-7 below.

TABLE 5

Properties of Inventive Examples

| Parameter | Example # | | | | | | |
|---|---|---|---|---|---|---|---|
| | 1 | 2 | 3 | 4 | 5 | 6 | 7 |
| % P (%) | 46.7 | 50.8 | 51.6 | 52.4 | 54.9 | 57.4 | 45.1 |
| $d_{v50}$ (μm) | 6.2 | 7.0 | 7.4 | 7.1 | 6.3 | 6.7 | 5.8 |
| $d_{v10}$ (μm) | 3.9 | 4.5 | 4.8 | 4.8 | 4.1 | 4.5 | 2.9 |
| $d_{v90}$ (μm) | 9.0 | 10.0 | 10.0 | 10.0 | 7.8 | 9.5 | 10.4 |
| $d_{vf} = (d_{v50} - d_{v10})/d_{v50}$ | 0.366 | 0.359 | 0.349 | 0.325 | 0.345 | 0.321 | 0.500 |
| $d_{vb} = (d_{v90} - d_{v10})/d_{v50}$ | 0.82 | 0.78 | 0.70 | 0.74 | 0.57 | 0.75 | 1.30 |
| % porosity ≧ 100 μm | 1.0 | 1.3 | 0.6 | 1.1 | 0.3 | 0.8 | 1.6 |
| % porosity ≦ 10.0 μm | 92.0 | 90.2 | 90.3 | 90.2 | 95.4 | 91.7 | 89.5 |

TABLE 5-continued

Properties of Inventive Examples

| Parameter | Example # 1 | 2 | 3 | 4 | 5 | 6 | 7 |
|---|---|---|---|---|---|---|---|
| % porosity ≦ 4.0 μm | 10.5 | 6.8 | 5.7 | 5.6 | 7.1 | 6.6 | 23.0 |
| 4.0 μm ≦ % porosity ≦ 10.0 μm | 81.5 | 83.4 | 84.6 | 84.6 | 88.3 | 85.1 | 66.5 |
| % Cordierite | 98 | 99 | n.a | n.a | n.a | n.a | 99 |
| % Mullite | 0.8 | 0.7 | n.a | n.a | n.a | n.a | 0.7 |
| % Spinel | 0.8 | 0.0 | n.a | n.a | n.a | n.a | 0.0 |
| MOR (psi) | 463 | 506 | 436 | 414 | 326 | NA | 542 |
| E-mod(×10³psi) | 751 | 605 | 653 | 539 | 421 | NA | 834 |
| MOR/E-mod (ppm) | 617 | 836 | 667 | 768 | 763 | NA | 649 |
| CTE (25-800° C.) × $10^{-7}$ | 1.8 | 2.6 | 4.3 | 3.9 | 6.0 | 5.9 | 4.1 |
| $CTE_H$ (500-900° C.) × $10^{-7}$ | 9.78 | 9.65 | 11.45 | 10.63 | 13.40 | 12.65 | 11.3 |
| TSP (° C.) | 630 | 866 | 582 | 722 | 569 | n.a | 574 |
| TSL (° C.) | 1130 | 1366 | 1082 | 1222 | 1069 | n.a | 1074 |
| ΔP @ 5 g/l, 26.25(210) scfm | 4.67 | 4.11 | 4.10 | n.a | 3.98 | n.a | 5.31 |
| FE @ t = 0 (%) | | | | | | | |
| Weight (gram) | 165 | 152 | 153 | n.a | 152 | n.a | 168 |
| Diameter (cm) | 5.1 | 5.1 | 5.1 | 5.1 | 5.1 | 5.1 | 5.1 |
| Height (cm) | 15.2 | 15.2 | 15.2 | 15.2 | 15.2 | 15.2 | 15.2 |
| Cell Density (cpsi) | 200 | 200 | 200 | 200 | 200 | 200 | 200 |
| $T_{wall}$ (mm) | 0.305 | 0.305 | 0.305 | 0.305 | 0.305 | 0.305 | 0.305 |
| % Area with Do > 20.0 μm | n.a | n.a | n.a | 43.0 | 41.0 | n.a | n.a |
| % Area with 10.0 μm ≦ Do ≦ 20.0 μm | n.a | n.a | n.a | 40.8 | 42.7 | n.a | n.a |
| Ra (μm) | 2.55 | 3.63 | 3.83 | 2.62 | 2.85 | 3.07 | 3.48 |

TABLE 6

Properties of Inventive Examples

| Example # | 8 | 9 | 10 | 11 | 12 | 13 | 14 |
|---|---|---|---|---|---|---|---|
| % P (%) | 46.0 | 50.8 | 52.4 | 51.8 | 52.6 | 55.4 | 41.1 |
| $d_{v50}$ (μm) | 5.7 | 4.6 | 4.7 | 7.3 | 7.7 | 7.3 | 5.8 |
| $d_{v10}$ (μm) | 3.0 | 3.1 | 3.2 | 4.7 | 4.7 | 4.9 | 3.4 |
| $d_{v90}$ (μm) | 9.8 | 6.2 | 6.5 | 10.0 | 10.9 | 9.1 | 10.3 |
| $d_{vf} = (d_{v50} - d_{v10})/d_{v50}$ | 0.474 | 0.332 | 0.321 | 0.355 | 0.391 | 0.323 | 0.413 |
| $d_{vb} = (d_{v90} - d_{v10})/d_{v50}$ | 1.20 | 0.68 | 1.4 | 0.73 | 0.81 | 0.58 | 1.19 |
| % porosity ≧ 100 μm | 1.1 | 0.9 | 1.4 | 1.3 | 1.4 | 1.5 | 2.1 |
| % porosity ≦ 10.0 μm | 90.4 | 95.4 | 94.5 | 90.0 | 87.6 | 92.8 | 89.7 |
| % porosity ≦ 4.0 μm | 22.9 | 33.3 | 28.2 | 7.0 | 6.5 | 5.3 | 14.7 |
| 4.0 μm ≦ % porosity ≦ 10.0 μm | 67.5 | 62.1 | 66.3 | 83.0 | 81.1 | 87.5 | 75.0 |
| % Cordierite | 99 | 99 | 99 | 99 | 99 | 99 | 99 |
| % Mullite | 0.7 | 0.7 | 0.7 | 0.7 | 0.5 | 0.7 | 0.8 |
| % Spinel | 0.0 | 0.0 | 0.0 | 0.0 | 0.6 | 0.0 | 0.0 |
| MOR Cell (psi) | n.a | 488 | 480 | 529 | 624 | 517 | 560 |
| E-mod (×10³psi) | n.a | 612 | 598 | 621 | 787 | 546 | 872 |
| MOR/E-mod (ppm) | n.a | 797 | 802 | 852 | 792 | 976 | 642 |
| CTE (25-800° C.) × $10^{-7}$ | 3.7 | 6.8 | 7.3 | 4.7 | 2.7 | 7.0 | 1.5 |
| $CTE_H$ (500-900° C.) × $10^{-7}$ | 10.6 | 13.75 | 14.18 | 12.55 | 9.70 | 13.94 | 8.95 |
| TSP (° C.) | n.a | 445 | 566 | 678 | 816 | 700 | 717 |
| TSL (° C.) | n.a | 945 | 1066 | 1178 | 1316 | 1200 | 1217 |
| ΔP @ 5 g/l, 26.25(210) scfm | n.a | 4.55 | n.a | 4.1 | n.a | n.a | 5.78 |
| FE @ t = 0 (%) | n.a | n.a | n.a | n.a | n.a | n.a | n.a |
| Weight (grams) | n.a | 157 | n.a | 153 | n.a | n.a | 179 |
| Diameter (cm) | 5.1 | 5.1 | 5.1 | 5.1 | 14.6 | 14.6 | 5.1 |
| Height (cm) | 15.2 | 15.2 | 15.2 | 15.2 | 15.2 | 15.2 | 15.2 |
| Cell Density (cpsi) | 200 | 200 | 200 | 200 | 300 | 300 | 200 |
| Twall (mm) | 0.305 | 0.305 | 0.305 | 0.305 | 0.330 | 0.330 | 0.305 |
| % Area with Do > 20.0 μm | n.a | n.a | n.a | n.a | n.a | n.a | 64.6 |
| % Area with 10.0 μm ≦ Do ≦ 20.0 μm | n.a | n.a | n.a | n.a | n.a | n.a | 23.5 |
| Ra (μm) | n.a | 2.95 | 2.17 | 2.41 | n.a | n.a | 2.52 |

TABLE 7

Properties of Inventive Examples

| Example # | 15 | 16 | 17 | 18 | 19 | 20 | 21 |
|---|---|---|---|---|---|---|---|
| % P (%) | 46.8 | 45.8 | 49.7 | 47.3 | 46.3 | 57.4 | 51.2 |
| $d_{v50}$ (μm) | 7.0 | 6.5 | 8.4 | 6.3 | 6.0 | 6.7 | 5.0 |
| $d_{v10}$ (μm) | 4.1 | 3.6 | 5.3 | 4.0 | 3.7 | 4.5 | 3.3 |
| $d_{v90}$ (μm) | 12.3 | 10.5 | 13.1 | 9.2 | 9.4 | 9.5 | 7.7 |
| $d_{vf} = (d_{v50} - d_{v10})/d_{v50}$ | 0.411 | 0.45 | 0.37 | 0.365 | 0.383 | 0.321 | 0.352 |
| $d_{vb} = (d_{v90} - d_{v10})/d_{v50}$ | 1.15 | 1.07 | 0.92 | 0.83 | 0.95 | 0.75 | 0.88 |
| % porosity ≧ 100 μm | 1.2 | 0.9 | 0.6 | 1.1 | 1.2 | 0.8 | 1.3 |
| % porosity ≦ 10.0 μm | 87.5 | 89.0 | 76.4 | 90.7 | 92.0 | 91.9 | 93.7 |
| % porosity ≦ 4.0 μm | 9.5 | 13.4 | 2.8 | 10.0 | 11.2 | 7.8 | 19.5 |
| 4.0 μm ≦ % porosity ≦ 10.0 μm | 78.0 | 75.6 | 73.6 | 80.7 | 80.8 | 84.1 | 80.2 |
| % Cordierite | 99 | n.a | n.a | 98 | 98 | 98 | 99 |
| % Mullite | 0.7 | n.a | n.a | 0.8 | 0.8 | 1.0 | 0.8 |
| % Spinel | 0.0 | n.a | n.a | 0.8 | 0.8 | 0.6 | 0 |
| MOR Cell (psi) | 454 | 623 | 459 | 463 | 463 | 339 | 755 |
| E-mod (×10³psi) | 774 | 1130 | 701 | n.a | n.a | 435 | 1160 |
| MOR/E-mod (ppm) | 586 | 551 | 655 | n.a | n.a | 779 | 651 |
| CTE (25-800° C.) × $10^{-7}$ | 1.1 | 1.5 | 2.6 | 2.8 | 3.3 | 5.9 | 2.7 |
| $CTE_H$ (500-900° C.) × $10^{-7}$ | 8.78 | 10.05 | 10.9 | 10.98 | 11.86 | 12.65 | 11.13 |
| TSP (° C.) | 667 | 548 | 600 | n.a | n.a | 615 | 584 |
| TSL (° C.) | 1167 | 1048 | 1100 | n.a | n.a | 1115 | 1084 |
| ΔP @ 5 g/l, 26.25(210) scfm | 4.98 | 4.75 | 4.21 | n.a | n.a | 3.88 | 5.84 |
| FE @ t = 0 (%) | n.a | n.a | n.a | n.a | n.a | n.a | 96.2 |
| Weight (grams) | 202 | 197 | 191 | n.a | n.a | 145 | 1382 |
| Diameter (cm) | 5.1 | 5.1 | 5.1 | n.a | n.a | 5.1 | 14.6 |
| Height (cm) | 15.2 | 15.2 | 15.2 | n.a | n.a | 15.2 | 15.2 |
| Cell Density (cpsi) | 200 | 300 | 300 | n.a | n.a | 200 | 300 |
| Twall (mm) | 0.305 | 0.330 | 0.330 | n.a | n.a | 0.305 | 0.330 |
| % Area with Do > 20.0 μm | 59.8 | n.a | n.a | n.a | n.a | n.a | n.a |
| % Area with 10.0 μm ≦ Do ≦ 20.0 μm | 26.2 | n.a | n.a | n.a | n.a | n.a | n.a |
| Ra (μm) | 2.33 | n.a | n.a | n.a | n.a | n.a | n.a |

Additionally, as is demonstrated by the above data, the cordierite ceramic honeycomb articles have a porous cordierite ceramic structure having a plurality of cell channels defined by intersecting cell walls exhibiting a relatively high total porosity (% P) wherein % P≧40%, and a wall surface roughness Ra<4.0 μm, Ra<3.5 μm, or even Ra<3.0 μm. Certain exemplary embodiments exhibit Ra<2.8 or even Ra<2.6. Even when % P>45%, or even % P>50%, then Ra<4.0 μm is achieved by the invention. In exemplary embodiments Ra<3.0 and % P≧50% is achieved. Accordingly, a very smooth fine porosity surface is achieved by the invention even when the porosity is large. This provides more even soot distribution on the surface and eliminates hot spots during regeneration.

The surface roughness Ra, as noted above, is defined as an arithmetic average roughness measured on a Zyglo New View 5000, white light interferometer, in a predetermined direction on the wall surface according to ISO4287/1, and is calculated as an average value of absolute deviations of the concave/convex surface portions from an average line. The scan is based on a bipolar measurement control setting, scan length of 179 μm, image zoom of 40×, and the high and low filter frequencies on the analyze control filters set on 10 μm and 100 μm, respectively.

Figure 3:
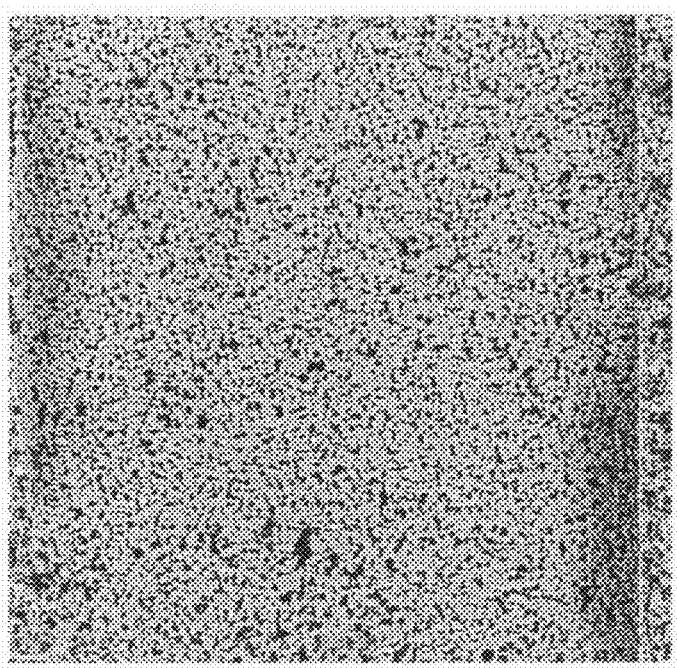
FIG. 3 is a micrograph image at of a representative fired surface microstructure of the inventive cordierite honeycomb at 100× magnification.
Figure 4:
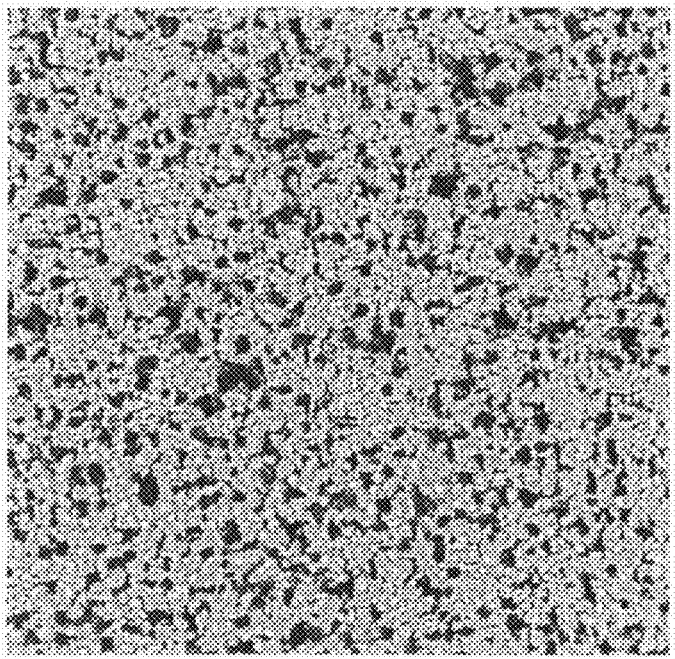
FIG. 4 is a micrograph image of a representative fired surface microstructure of the inventive cordierite honeycomb at 250× magnification.

Characterized in another way, the porous ceramic honeycomb article comprises a porous cordierite ceramic structure having a plurality of cell channels and intersecting cell walls, and the walls exhibit relatively high porosity and relatively high percentage of open surface area with a pore diameter 10.0 μm≦$D_o$≦20.0 μm, as compared to the total open wall area. In particular, the walls may exhibit a total porosity (% P) wherein % P≧40%, and a surface opening area of the walls having a surface opening diameter of 10.0 μm≦$D_o$≦20.0 μm which constitutes greater than 23%, greater than 30%, or even greater than 40% of a total open surface area of the walls, as measured by a scanning electron microscope (SEM). SEM images of the as-fired surface at 100× and 250× magnification are shown in FIGS. 3-4, for example, respectively.

In further exemplary embodiments, the surface opening area of the walls having a surface opening diameter $D_o$>20.0 μm constitutes less than 65%, less than 60%, less than 50%, or even less than 45% of a total open surface area of the walls. All measurements of surface opening area are on an Amray 1645 SEM at an acceleration potential of 25 KV, 100× magnification, 8-bit grayscale range, and on a 1000 μm×1000 μm measurement area.

It should also be understood that while the present invention has been described in detail with respect to certain illustrative and specific aspects thereof, the invention should not be considered limited to such, as numerous modifications are possible without departing from the broad scope of the invention as defined in the appended claims.

What is claimed is:

1. A porous ceramic honeycomb article, comprising:
    a porous ceramic honeycomb body containing cordierite and having a plurality of cell channels defined by intersecting porous walls, said walls including porosity having a pore size distribution wherein
    greater than or equal to 75% of the pore size distribution of the porosity of the porous walls, by volume, have a pore diameter ($d_v$) wherein $d_v$<10.0 μm, and less than or equal to 35% of the pore size distribution have $d_v$≦4.0 μm,
    a pore diameter ($d_{v90}$) of $d_{v90}$≦14.0 μm
    $d_{vf}$<0.37, and
    CTE≦12.0×$10^{-7}$/° C. from 25° C. to 800° C.

2. The porous ceramic honeycomb article of claim 1, further comprising:
   $MOR/e\text{-}Mod_{RT} > 600$ ppm.

3. The porous ceramic honeycomb article of claim 1, further comprising:
   % $P \geq 50$%.

4. The porous ceramic honeycomb article of claim 1, further comprising a median pore diameter ($d_{v50}$) wherein $4.0 \mu m \geq d_{v50} < 10.0 \mu m$.

5. The porous ceramic honeycomb article of claim 1, further comprising a pore diameter ($d_{v10}$) wherein $d_{v10} \geq 2.0 \mu m$.

6. The porous ceramic honeycomb article of claim 1, further comprising $d_{vb} \leq 1.10$ wherein $d_{vb} = (d_{v90} - d_{v10})/d_{v50}$.

7. The porous ceramic honeycomb article of claim 1, further comprising greater than 80% of the pore size distribution of the porosity of the porous walls, by volume, have a pore diameter ($d_v$) less than 10.0 $\mu m$.

8. The porous ceramic honeycomb article of claim 1, further comprising:
   % of porosity having a pore diameter ($d_v$) wherein $4.0 \mu m \leq d_v \leq 10.0 \mu m$ is greater than or equal to 75% by volume.

9. The porous ceramic honeycomb article of claim 1, further comprising:
   $CTE \geq 5.0 \times 10^{-7}/°C$. between 25° C. and 800° C.

10. The porous ceramic honeycomb article of claim 1, further comprising:
    $MOR/e\text{-}Mod > 600$ ppm wherein MOR is a modulus of rupture strength on a cellular bar in psi, E-mod is a room temperature elastic modulus, and CTE is a coefficient of thermal expansion measured between 25° C. and 800° C.

11. A porous ceramic honeycomb article, comprising:
    a porous ceramic honeycomb body containing cordierite and having a plurality of cell channels defined by intersecting porous walls, said walls including porosity having a pore size distribution wherein greater than or equal to 75% of the pore size distribution of the porosity of the porous walls, by volume, have a pore diameter ($d_v$) wherein $d_v < 10.0 \mu m$, and less than or equal to 35% of the pore size distribution have $d_v \leq 4.0 \mu m$,
    a pore diameter ($d_{v90}$) of $d_{v90} \leq 14.0 \mu m$,
    $CTE \leq 12.0 \times 10^{-7}/°C$. from 25° C. to 800° C., and
    $d_{vb} \leq 1.10$ wherein $d_{vb} = (d_{v90} - d_{v10})/d_{v50}$.

12. The porous ceramic honeycomb article of claim 11, further comprising:
    $MOR/e\text{-}Mod_{RT} > 600$ ppm.

13. The porous ceramic honeycomb article of claim 11, further comprising:
    % $P \geq 50$%.

14. The porous ceramic honeycomb article of claim 11, further comprising a median pore diameter ($d_{v50}$) wherein $4.0 \mu m \geq d_{v50} < 10.0 \mu m$.

15. The porous ceramic honeycomb article of claim 11, further comprising a pore diameter ($d_{v10}$) wherein $d_{v10} \geq 2.0 \mu m$.

16. The porous ceramic honeycomb article of claim 11, further comprising greater than 80% of the pore size distribution of the porosity of the porous walls, by volume, have a pore diameter ($d_v$) less than 10.0 $\mu m$.

17. The porous ceramic honeycomb article of claim 11, further comprising:
    % of porosity having a pore diameter ($d_v$) wherein $4.0 \mu m \leq d_v \leq 10.0 \mu m$ is greater than or equal to 75% by volume.

18. The porous ceramic honeycomb article of claim 11, further comprising:
    $CTE \leq 5.0 \times 10^{-7}/°C$. between 25° C. and 800° C.

19. The porous ceramic honeycomb article of claim 11, further comprising:
    $MOR/e\text{-}Mod > 600$ ppm wherein MOR is a modulus of rupture strength on a cellular bar in psi, E-mod is a room temperature elastic modulus, and CTE is a coefficient of thermal expansion measured between 25° C. and 800° C.

* * * * *